United States Patent
Li et al.

(10) Patent No.: US 10,843,134 B2
(45) Date of Patent: Nov. 24, 2020

(54) USE OF SURFACE MODIFIED POROUS MEMBRANES FOR FLUID DISTILLATION

(71) Applicant: William Marsh Rice University, Houston, TX (US)

(72) Inventors: Qilin Li, Houston, TX (US); Jinjian Wu, Houston, TX (US); Nancy J. Halas, Houston, TX (US); Katherine R. Zodrow, Bellaire, TX (US); Haoli Guo, Beijing (CN); Jiarui Xu, Houston, TX (US); Cong Yu, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 15/516,123

(22) PCT Filed: Oct. 5, 2015

(86) PCT No.: PCT/US2015/054028
§ 371 (c)(1),
(2) Date: Mar. 31, 2017

(87) PCT Pub. No.: WO2016/054643
PCT Pub. Date: Apr. 7, 2016

(65) Prior Publication Data
US 2017/0246592 A1 Aug. 31, 2017

Related U.S. Application Data

(60) Provisional application No. 62/059,322, filed on Oct. 3, 2014.

(51) Int. Cl.
*B01D 61/36* (2006.01)
*B01D 67/00* (2006.01)

(52) U.S. Cl.
CPC ....... *B01D 61/364* (2013.01); *B01D 67/0088* (2013.01); *B01D 2313/36* (2013.01)

(58) Field of Classification Search
None
See application file for complete search history.

(56) References Cited

U.S. PATENT DOCUMENTS 5,089,122 A 2/1992 Chmiel
2008/0237126 A1* 10/2008 Hoek ............... B01D 67/0079
210/637

(Continued)

FOREIGN PATENT DOCUMENTS

GB 2229379 A 9/1990
WO WO-2011113117 A1 9/2011
(Continued)

OTHER PUBLICATIONS

Stanfor News, Oct. 31, 2012.*
(Continued)

*Primary Examiner* — Krishnan S Menon
(74) *Attorney, Agent, or Firm* — Dickinson Wright PLLC; Ross Spencer Garsson

(57) ABSTRACT

In some embodiments, the present disclosure pertains to systems and methods for distilling a fluid by exposing the fluid to a porous membrane that includes a surface capable of generating heat. In some embodiments, the heat generated at the surface propagates the distilling of the fluid by converting the fluid to a vapor that flows through the porous membrane and condenses to a distillate. In some embodiments, the surface capable of generating heat is associated with a photo-thermal composition that generates the heat at the surface by converting light energy from a light source to thermal energy. In some embodiments, the photo-thermal composition includes, without limitation, noble metals, semiconducting materials, dielectric materials, carbon- (Continued)

based materials, composite materials, nanocomposite materials, nanoparticles, hydrophilic materials, polymers, fibers, meshes, fiber meshes, hydrogels, hydrogel meshes, nanomaterials, and combinations thereof. Further embodiments pertain to methods of making the porous membranes of the present disclosure.

29 Claims, 15 Drawing Sheets

(56) References Cited

U.S. PATENT DOCUMENTS

2013/0277199 A1  10/2013  Summers et al.
2015/0096935 A1* 4/2015  Mitra ................. B01D 67/0088
                                              210/500.23

FOREIGN PATENT DOCUMENTS

WO    WO-2013151498 A1    10/2013
WO    WO-2015189705 A1    12/2015

OTHER PUBLICATIONS

The quartz page—physical properties, Nov. 4, 2011.*
International Preliminary Report on Patentability for PCT/US2015/054028, dated Apr. 13, 2017.
International Search Report and Written Opinion for PCT/US2015/054028, dated Jan. 11, 2016.
Quilin Li., "Water and Energy Nexus: A Global Challenge That Requires Local Solutions." Nov. 2013 Presentation.
Neumann O, Urban AS, Day J, Lai S, Nordlander P, Hales NJ. Solar Vapor Generation Enabled by Nanoparticles. AcsNano. 2013;7:42-9.
Han D, Meng Z, Wu D, Zhang C, Zhu H. Thermal properties of carbon black aqueous nanofluids for solar absorption. Nanoscale Research Letters. 2011;6:457.
Service RF. Desalination freshens up. Science. 2006;313:1088-90.
Kalogirou SA. Solar thermal collectors and applications. Progress in Energy and Combustion Science. 2004;30:231-95.
Schofield RW, Fane AG, Fell CJD. Heat and Mass-Transfer in Membrane Distillation. Journal of Membrane Science. 1987;33:299-313.
Banat F, Jwaied N, Rommel M, Koschikowski J, Wieghaus M. Performance evaluation of the "large SMADES" autonomous desalination solar-driven membrane distillation plant in Aqaba, Jordan. Desalination. 2007;217:17-28.
Banat F, Jwaied N, Rommel M, Koschikowski J, Wieghaus M. Desalination by a "compact SMADES" autonomous solar-powered membrane distillation unit. Desalination. 2007;217:29-37.
Camacho LM, Dumee L, Zhang J, Li J-d, Duke M, Gomez J, et al. Advances in Membrane Distillation for Water Desalination and Purification Applications. Water. 2013;5:94-196.
Govorov AO, Richardson HH. Generating heat with metal nanoparticles. Nano Today. 2007;2:30-8.
Lukianova-Hleb E, Hu Y, Latterini L, Tarpani L, Lee S, Drezek RA, et al. Plasmonic Nanobubbles as Transient Vapor Nanobubbles Generated around Plasmonic Nanoparticles. Acs Nano. 2010;4:2109-23.
Chen X, Chen Y, Yan M, Qiu M. Nanosecond Photothermal Effects in Plasmonic Nanostructures. Acs Nano. 2012;6:2550-7.
Furlani EP, Karampelas IH, Xie Q. Analysis of pulsed laser plasmon-assisted photothermal heating and bubble generation at the nanoscale. Lab on a Chip. 2012;12:3707-19.
Carlson MT, Green AJ, Richardson HH. Superheating Water by CW Excitation of Gold Nanodots. Nano Letters. 2012;12:1534-7.
Wu M-C, Deokar AR, Liao J-H, Shih P-Y, Ling Y-C. Graphene-Based Photothermal Agent for Rapid and Effective Killing of Bacteria. ACS Nano. 2013;7:1281-90.

Roper DK, Ahn W, Hoepfner M. Microscale heat transfer transduced by surface plasmon resonant gold nanoparticles. Journal of Physical Chemistry C. 2007;111:3636-41.
Fang Z, Zhen Y-R, Neumann O, Polman A, Javier Garcia de Abajo F, Nordlander P, et al. Evolution of Light-Induced Vapor Generation at a Liquid-Immersed Metallic Nanoparticle. Nano Letters. 2013;13:1736-42.
Vanherck K, Hermans S, Verbiest T, Vankelecom I. Using the photothermal effect to improve membrane separations via localized heating. Journal of Materials Chemistry. 2011;21:6079-87.
Vanherck K, Vankelecom I, Verbiest T. Improving fluxes of polyimide membranes containing gold nanoparticles by photothermal heating. Journal of Membrane Science. 2011;373:5-13.
Nair RR, Wu HA, Jayaram PN, Grigorieva IV, Geim AK. Unimpeded Permeation of Water Through Helium-Leak-Tight Graphene-Based Membranes. Science. 2012;335:442-4.
Kovtyukhova NI, Ollivier PJ, Martin BR, Mallouk TE, Chizhik SA, Buzaneva EV, et al. Layer-by-Layer Assembly of Ultrathin Composite Films from Micron-Sized Graphite Oxide Sheets and Polycations. Chemistry of Materials. 1999;11:771-8.
Lee H, Dellatore SM, Miller WM, Messersmith PB. Mussel-inspired surface chemistry for multifunctional coatings. Science. 2007;318:426-30.
He H, Zhong M, Konkolewicz D, Yacatto K, Rappold T, Sugar G, et al. Carbon black functionalized with hyperbranched polymers: synthesis, characterization, and application in reversible CO2 capture. Journal of Materials Chemistry A. 2013;1:6810-21.
Tan KL, Woon LL, Wong HK, Kang ET, Neoh KG. Surface modification of plasma-pretreated poly(tetrafluoroethylene) films by graft copolymerization. Macromolecules. 1993;26:2832-6.
Xu Z Li L, Wu F, Tan S, Zhang Z. The application of the modified PVDF ultrafiltration membranes in further purification of Ginkgo biloba extraction. Journal of Membrane Science. 2005;255:125-31.
McCloskey BD, Park HB, Ju H, Rowe BW, Miller DJ, Chun BJ, et al. Influence of polydopamine deposition conditions on pure water flux and foulant adhesion resistance of reverse osmosis, ultrafiltration, and microfiltration membranes. Polymer. 2010;51:3472-85.
Sun P, Zhu M, Wang K, Zhong M, Wei J, Wu D, et al. Selective Ion Penetration of Graphene Oxide Membranes. ACS Nano. 2012;7:428-37.
Hu M, Mi B. Enabling Graphene Oxide Nanosheets as Water Separation Membranes. Environmental Science & Technology. 2013;47:3715-23.
Liga M, Maguire-Boyle SJ, Jafry HR, Barron AR, Li Q. Silica Decorated TiO2 for Virus Inactivation in Drinking Water—Green Synthesis Method and Mechanisms of Enhanced Inactivation Kinetics. Environmental Science & Technology. 2013;47:6463-70.
Raciny I, Zodrow K, Li D, Li Q, Alvarez PJJ. Addition of a Magnetite Layer onto a Polysulfone Water Treatment Membrane to Enhance Virus Removal Water Science and Technology. 2011;63:2346-52.
Zodrow K, Brunet L, Mahendra S, Li D, Zhang A, Li Q, et al. Polysulfone Ultrafiltration Membrane Impregnated with Silver Nanoparticles Show Improved Biofouling Resistance and Virus Removal. Water Research. 2009;43:715-23.
Brame J, Li Q, Alvarez PJJ. Nanotechnology-Enabled Water Treatment and Reuse: Emerging Opportunities and Challenges for Developing Countries. Trends in Food Science and Technology, 2011:618-24.
Li Q, Mahendra S, Lyon DY, Brunet L, Liga ML, Li D, et al. Antimicrobial Nanomaterials for Water Disinfection and Microbial Control: Potential Applications and Implications. Water Research. 2008;42:4591-602.
Written Opinion and Search Report for Singapore Patent Application No. 11201703555P, dated Mar. 26, 2018.
Summers, Edward K., et al., "Experimental study of thermal performance in air gap membrane distillation systems, including the direct solar heating of membranes," Desalination 330 (2013) 100-111.
Extended European Search Report for EP15845976.8, dated Apr. 24, 2018.
Office Action for Chinese Application No. 201580066155.8, dated Sep. 26, 2019.

(56) References Cited

OTHER PUBLICATIONS

Written Opinion for Singapore Patent Application No. 11201703555P, dated Oct. 21, 2019.
Examination Report for Indian Application No. 201717015474, dated Nov. 13, 2019.
Gethard, K. et al., Water Desalination Using Carbon-Nanotube-Enhanced Membrane Distillation. *ACS Appl. Mater. Interfaces*, Dec. 28, 2010, vol. 3, pp. 110-114. Abstract Only.
Li, Y et al.; "Improving the performance of pervaporation membranes via localized heating through incorporation of silver nanoparticles", J. Mater. Chem. A., 2013, 1, 15031-15038.
Ghasemi, H, et al.; "Solar steam generation by heat localization", Nature Communications, 5:4449, Jul. 21, 2014.

\* cited by examiner

A

B

C

A

B

USE OF SURFACE MODIFIED POROUS MEMBRANES FOR FLUID DISTILLATION

CROSS-REFERENCE TO RELATED APPLICATIONS

This application claims priority to U.S. Provisional Patent Application No. 62/059,322, filed on Oct. 3, 2014. The entirety of the aforementioned application is incorporated herein by reference.

BACKGROUND

Current methods of distilling fluids have numerous limitations, including thermal inefficiencies, the need for heating the entire fluid, and excessive temperature polarization (in cases of membrane distillation). As such, a need exists for more effective methods and systems for distilling fluids.

SUMMARY

In some embodiments, the present disclosure pertains to methods of distilling a fluid. In some embodiments, the method includes a step of exposing the fluid to a porous membrane. In some embodiments, the porous membrane includes a surface capable of generating heat. In some embodiments, the heat generated at the surface propagates the distilling of the fluid by converting the fluid to a vapor that flows through the porous membrane and condenses to a distillate. In some embodiments, the distilling methods of the present disclosure also include a step of collecting the distillate.

In some embodiments, the fluid includes, without limitation, water, alcohols, organic solvents, volatile solvents, water-alcohol mixtures, and combinations thereof. In some embodiments, the distilling occurs by a membrane distillation method. In some embodiments, the distilling results in fluid desalination or purification.

In some embodiments, the porous membrane includes, without limitation, polypropylene, polyvinylidene fluoride, polytetrafluoroethylene, polyethylene, polycarbonates, cellulose, and combinations thereof. In some embodiments, the porous membrane includes a microporous membrane with pore sizes that range from about 0.2 µm to about 5.0 µm in diameter.

In some embodiments, the surface capable of generating heat spans an entire outer surface of the porous membrane. In some embodiments, the temperature of the surface remains constant during distilling.

In some embodiments, the surface is capable of generating heat when exposed to a light source. In some embodiments, the surface capable of generating heat is associated with a photo-thermal composition that generates the heat at the surface. In some embodiments, the photo-thermal composition generates the heat at the surface by converting light energy from a light source to thermal energy.

In some embodiments, the photo-thermal composition includes, without limitation, noble metals, semiconducting materials, dielectric materials, carbon-based materials (e.g., carbon black, graphite, graphene, graphene oxide, reduced graphene oxide), composite materials, nanocomposite materials, nanoparticles (e.g., $SiO_2$/Au nanoshells), hydrophilic materials, polymers, fibers, meshes, fiber meshes, hydrogels, hydrogel meshes, nanomaterials, and combinations thereof.

In some embodiments, the photo-thermal composition includes nanoparticles. In some embodiments, the nanoparticles include, without limitation, noble metal nanoparticles, metal oxide nanoparticles, semiconductor nanoparticles, gold nanoparticles, nanorods, nanoshells, $SiO_2$/Au nanoshells, carbon black nanoparticles, graphene nanoparticles, graphene oxide nanoparticles, reduced graphene oxide nanoparticles, and combinations thereof.

In some embodiments, the photo-thermal composition is only associated with the surface of the porous membrane. In some embodiments, the photo-thermal composition is directly associated with the surface of the porous membrane. In some embodiments, the photo-thermal composition is embedded in a polymer layer coated on the surface of the porous membrane. In some embodiments, the photo-thermal composition is coated on a polymer layer (e.g., polymer mesh) that is on the surface of the porous membrane.

In some embodiments, the surface is associated with the photo-thermal composition through at least one of covalent bonds, non-covalent bonds, physisorption, hydrogen bonds, van der Waals interactions, London forces, dipole-dipole interactions, and combinations thereof. In some embodiments, the photo-thermal composition is cross-linked to the surface. In some embodiments, the surface is coated with the photo-thermal composition. In some embodiments, the photo-thermal composition is cross-linked within the coating.

In some embodiments, the methods of the present disclosure also include a step of exposing the surface of the porous membrane to a light source. In some embodiments, the light source facilitates heat generation by the surface. In some embodiments, the light source includes sunlight.

In some embodiments, the methods of the present disclosure occur without heating of the bulk fluid (e.g., without heating of the entire fluid or generalized heating). In some embodiments, the methods of the present disclosure occur by only heating the fluid near the surface of the porous membrane. In some embodiments, the method occurs without the use of electric energy.

In some embodiments, the present disclosure pertains to systems for distilling a fluid. In some embodiments, the systems of the present disclosure include the porous membranes of the present disclosure. Further embodiments of the present disclosure pertain to methods of making the porous membranes.

DESCRIPTION OF THE DRAWINGS

FIG. 2A shows temperature polarization in current MD technology. FIG. 2B shows a porous membrane that is coated with a photo-thermal composition with reverse temperature polarization.

FIG. 8A shows a histogram of the M-ESPC fiber diameters. FIG. 8B shows a chart of fiber diameters for various HM-ESPCs with different concentrations of CBNPs.

FIG. 12A shows hydrophobic PVDF, electrospun mats of hydrophobic PMMA fibers, and PVDF membranes modified with CBNP. FIG. 12B shows PVDF membranes modified with hydrophilic PVA fibers with different electrospinning times (5 minutes to 2 hours). Bars with blue hash marks contain 2% CBNP.

DETAILED DESCRIPTION

Figure 1:
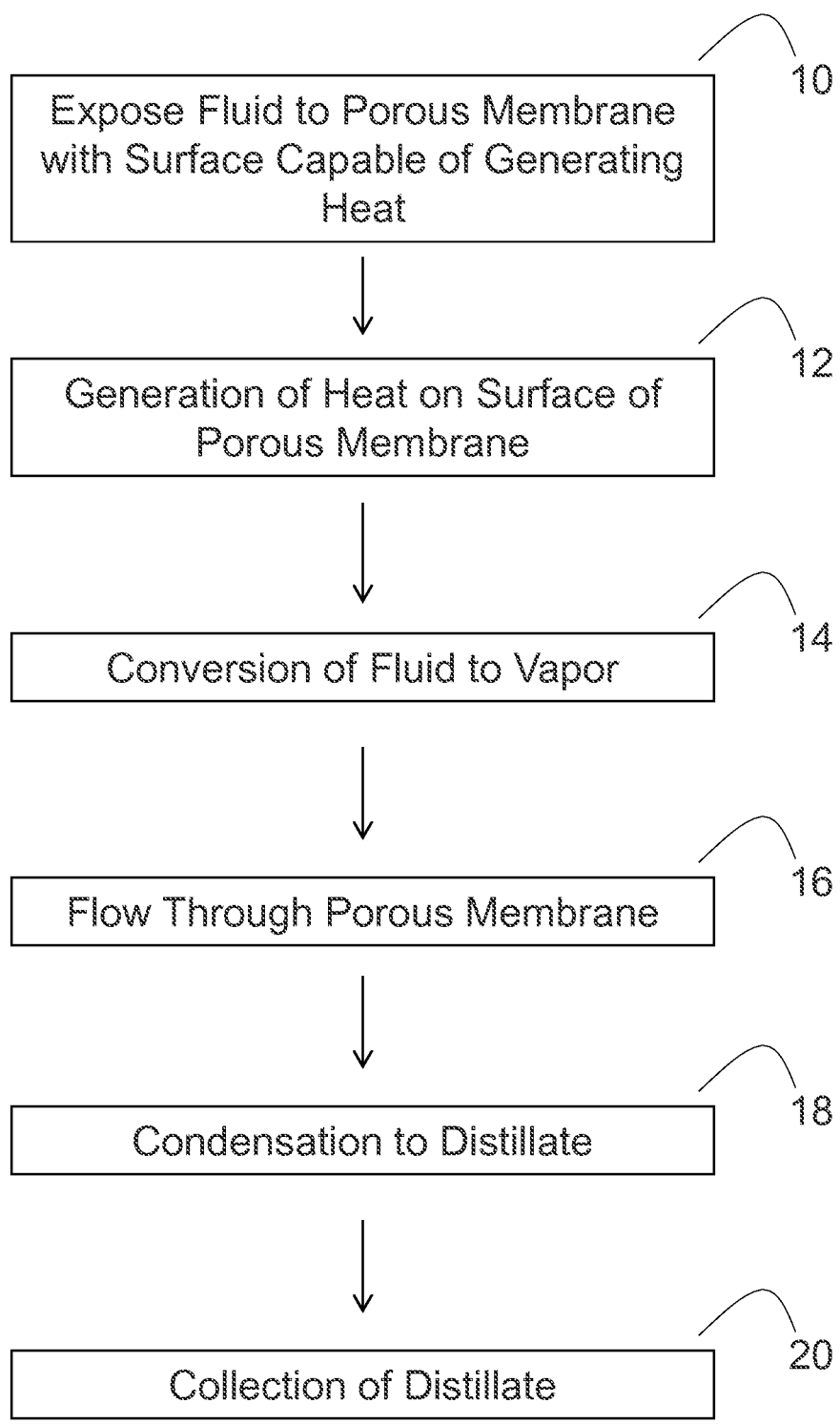
FIG. 1 illustrates a method (FIG. 1A) and a system (FIG. 1B) for distilling fluids using membrane distillation.
Figure 1:
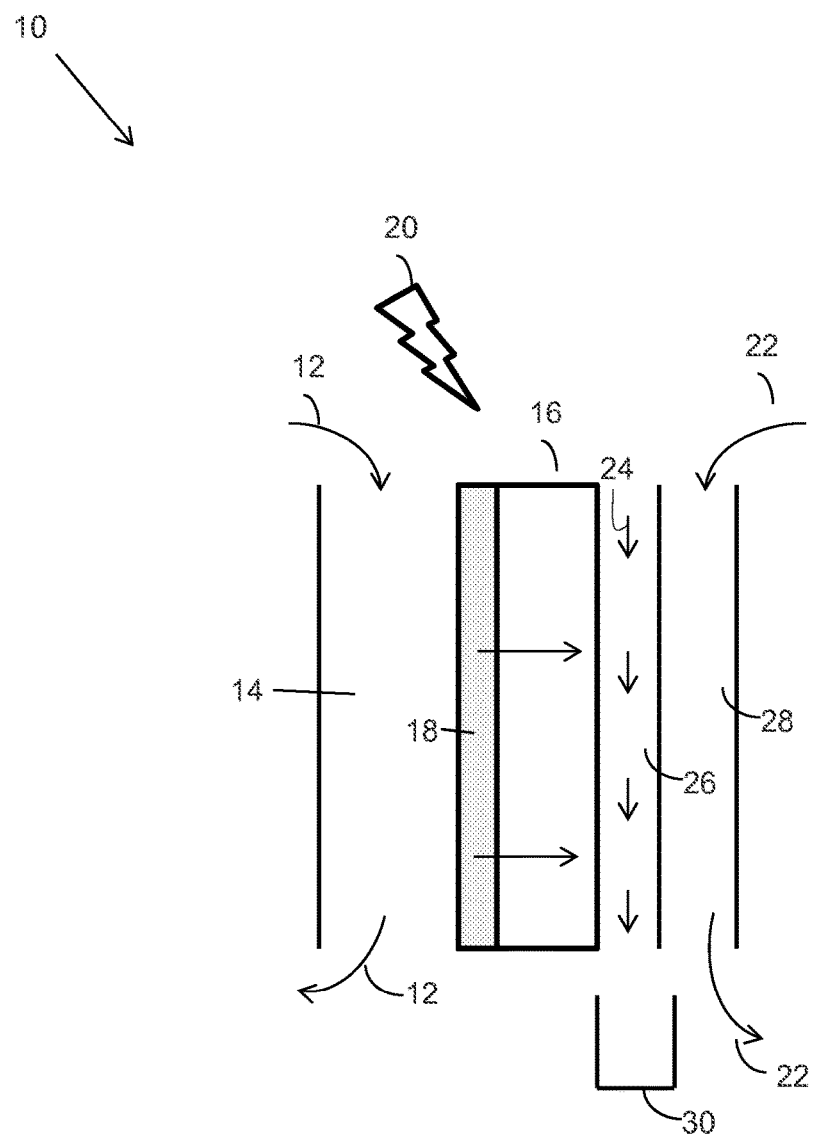

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Purified fluids play essential roles in everyday life. For instance, no other resource is as universally necessary for life as is water. Moreover, the safety and availability of purified water is a grand challenge inextricably linked to global health, energy production and economic development.

However, access to clean water is a fast-growing challenge due to population growth, increased water pollution by recalcitrant and hazardous contaminants, and climate change that threatens to exacerbate water scarcity in many areas. As such, a need exists for technological innovation to tap unconventional water sources and meet the fast-growing demand for affordable water.

Extracting clean water from saline (e.g., seawater and brackish groundwater) or contaminated water sources holds tremendous potential in meeting the world's current and future water needs. For instance, desalination and water purification by evaporation or reverse osmosis has become an important water source in many parts of the world. In 2004, $3.24 \times 10^7$ m$^3$/day of fresh water was produced by desalination plants worldwide.

However, desalination is a highly energy intensive process. Considered as the most energy efficient desalination technology, reverse osmosis (RO) still consumes 1.5 to 2.5 kwh/m$^3$ to desalinate seawater. Moreover, the complex, high pressure system requires significant capital investment and extensive pretreatment in order to control membrane fouling.

For instance, in many locations in the developing world where sufficient and safe water supply is lacking, there is no access to electricity. Moreover, limited fund is available for purchasing equipment. Furthermore, trained operators are not available to run a complex water purification system.

Accordingly, off-grid, simple, low cost and high efficiency water desalination and purification systems are greatly needed. Solar membrane distillation is a technology that could potentially meet this need.

Figure 2:
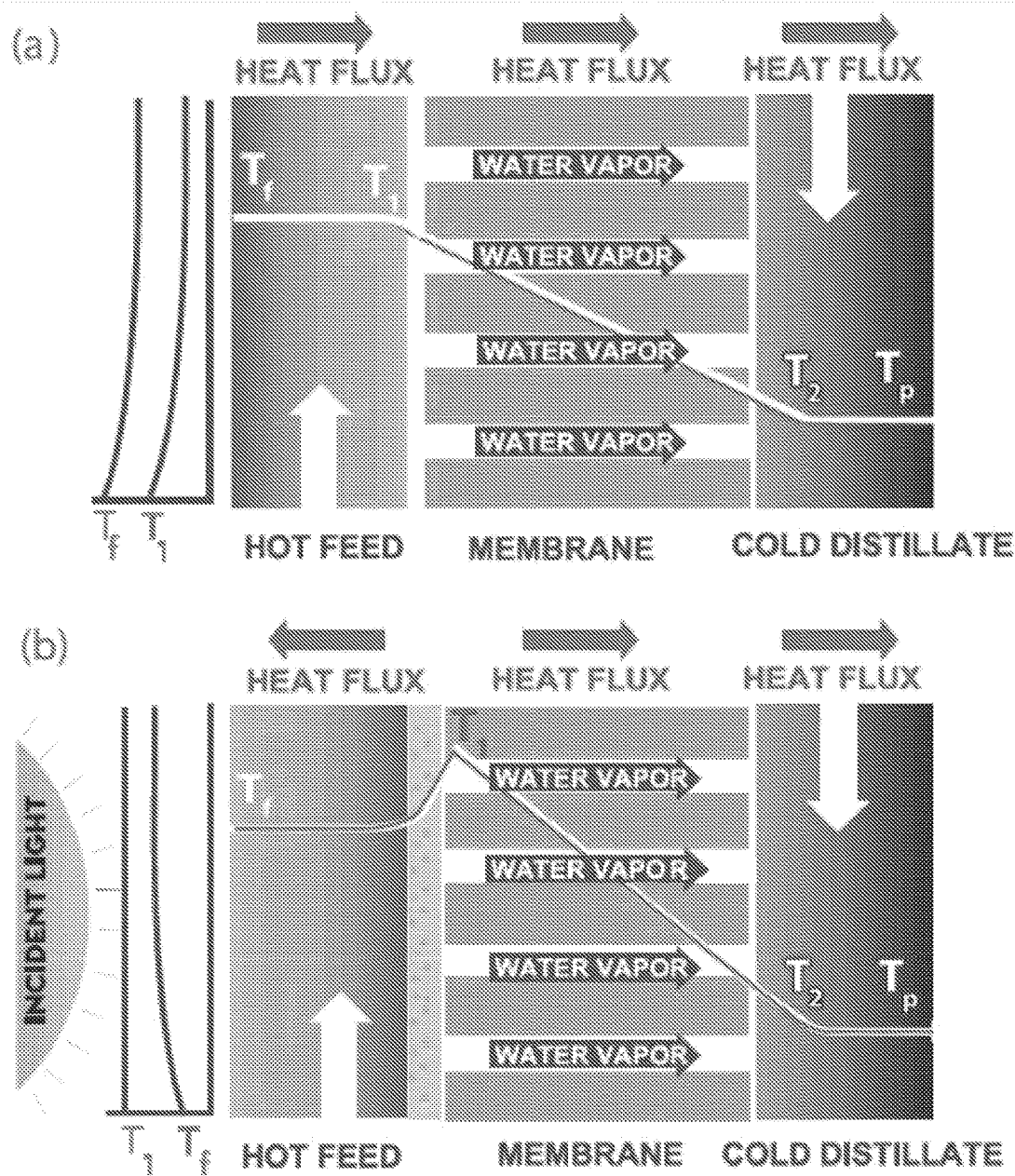
FIG. 2 shows the temperature profile and heat fluxes in membrane distillation (MD).

Membrane distillation (MD) utilizes the vapor pressure difference across a porous, hydrophobic membrane that separates the hot feed stream and the cold permeate stream to drive flux of water vapor from the feed stream to the permeate stream and generate purified water upon condensation (FIG. 2A). The water vapor flux through the porous membrane J can be described by Equation 1:

$$J = k_m[p(T_1) - p(T_2)] \quad (1)$$

Here, $k_m$ is the water vapor permeability of the membrane (m/s-mmHg); $T_1$ and $T_2$ (° C.) are the temperature at the membrane surface on the feed and permeate side, respectively; and p (mmHg) is the vapor pressure of water, which can be estimated using the Antoine Equation (Equation 2):

$$\log_{10} p = 8.07131 - \frac{1730.63}{233.426 + T} (1° \text{ C.} \leq T \leq 100° \text{ C.}) \quad (2)$$

MD has several unique advantages over other desalination technologies. For instance, since MD operates below the boiling point of water, its thermal energy consumption is significantly lower than other evaporation based desalination processes. Moreover, the flow of water vapor through the membrane is driven by the partial pressure difference due to the temperature gradient instead of trans-membrane pressure. Therefore, electric energy consumption and requirement for membrane mechanical strength is low. In addition, as the partial pressure of water vapor is not significantly affected by salinity, MD can be applied to water with very high salinity and without significantly affecting the energy consumption.

Furthermore, because there is no water flow through the membrane, membrane fouling is much less in MD than in RO systems. In addition, unlike RO, MD can operate intermittently without damaging the membrane. Finally, the low operating temperature and the flexibility of operation cycles make MD an optimal candidate for solar desalination. Accordingly, the solar energy is harvested to both heat the feed water and generate electricity for pumping.

A solar MD system uses a solar thermal collector to heat the feed water either directly or through heat exchange with a working fluid and a photovoltaic device to generate the electricity needed for pumping. Because the majority of the energy use in MD is thermal energy, the efficiency of the solar thermal collector and the thermal efficiency of the MD unit determine the overall energy efficiency of a solar MD system. Although the optical efficiency of various solar collectors (defined as the fraction of solar irradiation that is absorbed) can be as high as 80%, the heat loss in solar collectors reduces the total efficiency to 20-70%, depending on the type of collectors and the operating temperature.

In the MD unit, there are two major sources of energy loss. The first source is temperature polarization. Due to conductive and latent heat transfer, the temperature at the membrane surface on the feed side $T_1$ can be significantly lower than that in the bulk feed solution $T_f$ (FIG. 2A). Similarly, $T_2$ at the membrane surface on the permeate side is higher than the temperature of the bulk permeate water $T_p$. Temperature polarization could reduce the transmembrane temperature gradient by up to 70%, which greatly reduces the driving force for vapor transport. A temperature polarization coefficient $\alpha_{TP}$ can be measured in accordance with Equation 3:

$$\alpha_{TP} = \frac{T_1 - T_2}{T_f - T_p} \quad (3)$$

Furthermore, the heat transfer across the membrane causes diminished temperature difference between feed and permeate along the membrane length, which limits the production rate of an MD unit and poses a major scale-up challenge.

Another important source of energy loss is the brine. Heat loss through the discharge of the brine increases with decreasing water recovery. The single pass water recovery in solar MD is typically below 5% (i.e., 95% of the heat in the feed water is lost). With brine recirculation, product water recovery for MD can reach 65% to 95%, but this increases system complexity and pumping cost.

In addition, high water recovery may lead to scaling. Heat exchangers can be used to recover heat from permeate and brine, but that also adds significantly to system complexity and cost.

In sum, current MD processes have several limitations. For instance, current MD processes require high thermal energy consumption. Electricity is used to heat the feed water to a high temperature to drive the MD process. Therefore, the electric energy consumption is very high. Moreover, temperature polarization (i.e., lower temperature at the membrane surface on the feed side than the bulk feed water, and higher temperature at the membrane surface on the permeate side than the bulk permeate water) leads to reduced driving force and hence lower water vapor flux. In addition, the driving force decreases with flow channel length, thereby limiting the effective size of the membrane module. Moreover, current MD processes show a loss of residual heat in the brine discharge.

Furthermore, current solar membrane distillation systems use conventional solar collectors to heat up the feed water directly or through a heat exchanger. However, since water is a poor light absorber, direct heating of feed water by sun light is very inefficient. In addition, installing solar collectors and heat exchangers add complexity and cost to solar systems. In addition, since current solar MD systems heat up the bulk volume of feed water, significant thermal energy is lost via conduction across the membrane and hot brine discharge.

As such, a need exists for improved MD systems that have high thermal efficiency. A need also exists for improved MD systems that only heat the fraction of fluid recovered as permeate. In addition, a need exists for improved MD systems that have negligible temperature polarization. The present disclosure addresses these needs.

In some embodiments, the present disclosure pertains to methods of distilling a fluid. In some embodiments illustrated in FIG. 1A, such methods include one or more of the following steps: exposing the fluid to a porous membrane with a surface capable of generating heat (step 10); generation of heat at the surface of the porous membrane (step 12); converting the fluid to a vapor (step 14); flowing the vapor through the porous membrane (step 16); condensing the fluid to a distillate (step 18); and collecting the distillate (step 20).

In some embodiments, the present disclosure pertains to systems for distilling a fluid. In some embodiments illustrated in FIG. 1B, system 10 can be utilized to distill fluids. System 10 can include a porous membrane 16 with surface 18 that is capable of generating heat. In some embodiments, system 10 may also include a channel 14 for exposing fluid 12 to surface 18 of porous membrane 16. In some embodiments, system 10 may also include a channel 26 for flowing distillate 24, and a container 30 for collecting distillate 24. System 10 may also include channel 28 for flowing permeate fluid 22 through system 10. In addition, system 10 may be associated with light source 20.

In operation, fluid 12 can flow through channel 14 for exposure to surface 18 of porous membrane 16. Light source 20 can be used to facilitate the heating of surface 18. Thereafter, heat generated at surface 18 of porous membrane 16 propagates the distilling by converting fluid 12 to a vapor that flows through the porous membrane 16 and condenses to a distillate 24 that flows through channel 26 and into container 30. Permeate fluid 22 can also propagate the distilling by facilitating the condensation.

Further embodiments of the present disclosure pertain to methods of making membranes for fluid distillation. As set forth in more detail herein, various methods and systems may be utilized to distill various types of fluids. Moreover, various porous membranes may be utilized in the systems and methods of the present disclosure. Furthermore, various methods may be utilized to make the porous membranes of the present disclosure.

Porous Membranes

The methods and systems of the present disclosure can utilize various types of porous membranes. In some embodiments, the porous membranes of the present disclosure include porous membranes that serve as barriers between a fluid feed and permeate while allowing vapor to pass. In some embodiments, the porous membranes of the present disclosure are non-wetting membranes. In some embodiments, the porous membranes of the present disclosure are hydrophobic. In some embodiments, the porous membranes of the present disclosure have high hydrophobicity, chemical stability, and thermal stability.

The porous membranes of the present disclosure can have various compositions. For instance, in some embodiments, the porous membranes of the present disclosure can include, without limitation, polypropylene (PP), polyvinylidene fluoride (PVDF), polytetrafluoroethylene (PTFE), polyethylene, polycarbonates, cellulose, and combinations thereof.

The porous membranes of the present disclosure can have various porosities. For instance, in some embodiments, the pores in the porous membranes include diameters between about 1 nm to about 5 µm. In some embodiments, the pores include macropores with diameters of at least about 50 nm. In some embodiments, the pores include macropores with diameters between about 50 nm to about 3 µm. In some embodiments, the pores include macropores with diameters between about 500 nm to about 2 µm. In some embodiments, the pores include mesopores with diameters of less than about 50 nm. In some embodiments, the pores include micropores with diameters of less than about 2 nm.

In some embodiments, the porous membranes of the present disclosure include a microporous membrane. In some embodiments, the porous membranes of the present disclosure include pore sizes that range from about 0.2 µm to about 5.0 µm in diameter. In some embodiments, the porous membranes of the present disclosure include pore sizes that range from about 0.2 µm to about 1 µm in diameter. In some embodiments, the porous membranes of the present disclosure include pore sizes that range from about 1 µm to about 5 µm in diameter.

The porous membranes of the present disclosure can also have various shapes. For instance, in some embodiments, the porous membranes of the present disclosure are in the form of flat sheets. In some embodiments, the porous membranes of the present disclosure have a rectangular shape. Additional porous membrane shapes can also be envisioned.

In some embodiments, the porous membranes of the present disclosure include flat sheets of PTFE, PVDF and PP with pore sizes ranging from about 0.2 µm to about 1.0 µm in diameter. In some embodiments, the porous membranes of the present disclosure include hydrophobic and hydrophilic membranes with large pore sizes (e.g., PVDF, polycarbonate, and mixed cellulose ester porous membranes with pore sizes that range from about 1 µm to about 5 µm in diameter).

Porous Membrane Surfaces

The porous membrane surfaces of the present disclosure can have various attributes. For instance, in some embodiments, the porous membranes of the present disclosure include a surface that is capable of generating heat. In some embodiments, the surface is hydrophobic. In some embodiments, the heat is only generated at the surface of the porous membrane. In some embodiments, the heat generated at the surface of the porous membrane propagates the distilling of the fluid. In some embodiments, the surface capable of generating heat spans an entire outer surface of the porous membrane (e.g., surface 18 on porous membrane 16 in FIG. 1B). In some embodiments, the temperature of the surface remains constant during distilling. In some embodiments, the surface is capable of generating heat when exposed to a light source.

Photo-thermal Compositions

In some embodiments, the porous membranes of the present disclosure are also associated with a photo-thermal composition. In some embodiments, the photo-thermal composition is capable of generating heat. For instance, in some embodiments, a porous membrane surface capable of generating heat is associated with a photo-thermal composition. In some embodiments, the photo-thermal composition generates the heat at the surface. In some embodiments, the photo-thermal composition generates the heat at the surface by converting light energy from a light source to thermal energy.

The porous membrane surfaces of the present disclosure may be associated with various photo-thermal compositions. In some embodiments, the photo-thermal composition is hydrophilic. In some embodiments, the photo-thermal composition includes, without limitation, noble metals, semi-conducting materials, dielectric materials (e.g., Au nanoparticles), carbon-based materials, composite materials, nanocomposite materials, nanoparticles (e.g., $SiO_2$/Au nanoshells), hydrophilic materials, polymers, fibers, meshes, fiber meshes, hydrogels, hydrogel meshes, nanomaterials, and combinations thereof.

In some embodiments, the photo-thermal compositions of the present disclosure include carbon-based materials. In some embodiments, the carbon-based materials include, without limitation, carbon black, graphite, graphene, graphene oxide, reduced graphene oxide, and combinations thereof.

In some embodiments, the photo-thermal composition includes a polymer. In some embodiments, the polymer includes, without limitation, hydrophillic polymers, polymer fibers, electrospun polymers, functionalized polymers, and combinations thereof. In some embodiments, the photo-thermal composition includes a hydrophilic polymer, such as a poly(vinyl alcohol) (PVA). In some embodiments, the photo-thermal composition includes, without limitation, hydrophilic PVA fibers, electrospun PVA hydrogel fibers, hydrogel meshes, hydrogel fibers, and combinations thereof.

In some embodiments, the photo-thermal composition includes nanoparticles. In some embodiments, the nanoparticles include, without limitation, noble metal nanoparticles, metal oxide nanoparticles, semiconductor nanoparticles, gold nanoparticles, nanoshells, $SiO_2$/Au nanoshells, nanorods, carbon black (CB) nanoparticles, graphene nanoparticles, graphene oxide (GO) nanoparticles, reduced graphene oxide nanoparticles, and combinations thereof.

In some embodiments, the nanoparticles include one or more noble metals. In some embodiments, high nanoparticle concentrations can result in multiple scattering by neighboring nanoparticles that increase light absorption. In some embodiments, the nanoparticles are in the form of noble metals that are surface plasmon resonant.

The porous membrane surfaces of the present disclosure may be associated with photo-thermal compositions in various manners. For instance, in some embodiments, the surface capable of generating heat is associated with the photo-thermal composition through at least one of covalent bonds, non-covalent bonds, physisorption, hydrogen bonds, van der Waals interactions, London forces, dipole-dipole interactions, and combinations thereof. In some embodiments, the photo-thermal composition is cross-linked to a surface.

In some embodiments, the surface capable of generating heat is coated with the photo-thermal composition. In some embodiments, the photo-thermal composition is cross-linked within the coating.

In some embodiments, the photo-thermal composition is embedded in a polymer layer coated on the surface of the porous membrane. In some embodiments, the photo-thermal composition is coated on a polymer layer (e.g., polymer mesh) that is on the surface of the porous membrane. In some embodiments, the polymer layer is made of transparent materials. In some embodiments, the polymer layer includes, without limitation, polystyrenes, polyacrylonitriles, polymethyl methacrylates, polydopamine, and combinations thereof.

In some embodiments, the photo-thermal compositions of the present disclosure are only associated with the surface of the porous membrane that is capable of generating heat. In some embodiments, the photo-thermal composition is directly associated with the surface of the porous membrane that is capable of generating heat. In some embodiments, the remaining portions of the porous membranes lack the photo-thermal compositions. In some embodiments, the photo-thermal compositions do not penetrate the pores of the porous membrane.

In some embodiments where the photo-thermal compositions include nanoparticles, the nanoparticles may form an array on a surface of a porous membrane. In some embodiments, the nanoparticles are adjacent to one another. In some embodiments, the nanoparticles are embedded in a hydrophilic material coated on the surface. In some embodiments, the hydrophilic material includes, without limitation, polymers, meshes, fibers, mats, hydrogels, and combinations thereof. In some embodiments, the photo-thermal compositions of the present disclosure are in the form of nanoparticles that are covalently bound to a porous membrane surface.

Light Sources

In some embodiments, the methods of the present disclosure also include a step of exposing the surface of a porous membrane that is capable of generating heat to a light source. In some embodiment, the light source facilitates heat generation by the surface.

Various light sources may be utilized to generate heat at a surface. For instance, in some embodiments, the light source includes, without limitation, natural light (i.e., sunlight), incident light, visible light, ultraviolet light, near infrared light, laser, continuous wave laser, incandescent light, fluorescent light, LED light, light derived from solar radiation (e.g., light derived from solar panels), engineered light sources, and combinations thereof. In some embodiments, the light source includes sunlight.

In some embodiments, the light intensity from the light source is amplified by a light amplifier. In some embodiments, the light amplifier includes optical lenses.

In some embodiments, light sources are exposed to a surface of a porous membrane that includes photo-thermal compositions. In some embodiments, the photo-thermal compositions that are exposed to a light source include nanoparticles (as previously described).

In some embodiments, the nanoparticles are in the form of noble metals that are surface plasmon resonant. In some embodiments, the nanoparticles have semiconducting properties. Without being bound by theory, it is envisioned that noble metal NPs have abundant mobile electrons and therefore outstanding photo-thermal efficiency, which is further enhanced when the incident light wavelengths are near their surface plasmon resonance. Moreover, it is envisioned that, in such noble metal NPs, free electrons strongly absorb light across the UV to near infrared (NIR) wavelength range. These energetic electrons undergo electron-electron scattering, and rapidly (in picoseconds) transfer the kinetic energy to the lattice of the NP through electron-phonon interaction, as illustrated in Equation 4:

$$\tau_r = \frac{r_p^2}{6.75\alpha_p} \quad (4)$$

When the irradiation pulse is shorter than the relaxation time $\tau_r$ (Eq. 4) of a noble metal NP with a radius $r_p$ and thermal diffusivity $\alpha_p$, heating is confined in the noble metal NP with negligible heat loss on timescales<$\tau_r$, leading to rapid increase in the temperature of the NP. At slower irradiation rate, the thermal energy is then transferred to the surrounding fluid through phonon-phonon coupling.

When the noble metal NP is submerged in water, superheating of water up to its spinodal decomposition temperature at the nanoparticle-water interface has been reported. With multiple NPs, the heating effect is strongly enhanced not only due to the accumulative effect (multiple heat sources), but also the interaction between plasmon-enhanced electric fields of neighboring plasmonic NPs (Coulomb interaction).

In some embodiments, the nanoparticles of the present disclosure can also include $SiO_2$/Au nanoshells, carbon black (CB) NPs, graphene oxide (GO) NPs, and combinations thereof. In some embodiments, such NPs are advantageous for use as photo-thermal compositions because they absorb strongly across the whole solar spectrum.

For instance, a core-shell structure such as that in a $SiO_2$/Au nanoshell allows the plasmon resonance to be tuned to better match the incident light spectrum. Likewise, CB NPs are low-cost heat-conducting materials, and have been used in solar collectors as nanofluids for enhanced heat generation. Similarly, GO strongly absorbs over a wide spectrum ranging from UV to near infrared (NIR), and has been utilized in photo-thermal treatment of cancer cells using NIR lasers. More importantly, water vapor exhibits unique transport behavior through stacked GO sheets.

Exposing of Porous Membranes to Fluids

Various methods may also be utilized to expose the porous membranes of the present disclosure to fluids. For instance, in some embodiments, the porous membranes of the present disclosure are exposed to fluids by flowing the fluids through a channel that contains a porous membrane (e.g., channel 14 in FIG. 1B). In some embodiments, the fluid becomes associated with the surface of the porous membrane through direct contact with the surface. In some embodiments, the porous membranes of the present disclosure are exposed to fluids by incubating the fluids with the porous membrane. Additional exposure methods can also be envisioned.

Fluids

The methods and systems of the present disclosure may be utilized to distill various types of fluids. For instance, in some embodiments, the fluid includes, without limitation, water, alcohols, organic solvents, volatile solvents, water-alcohol mixtures, and combinations thereof. In some embodiments, the fluid includes an ethanol-water mixture. In some embodiments, the fluid includes water.

Propagation of Distillation

Various methods may be utilized to propagate the distilling of a fluid by a porous membrane. For instance, in some embodiments, the heat generated at a surface of the porous membranes propagates the distilling by converting the fluid to a vapor that flows through the porous membrane and condenses to a distillate. In some embodiments, the heat generated at the surface propagates the distilling by creating a temperature gradient across the porous membrane. Thereafter, the temperature gradient results in the formation of a vapor pressure gradient that drives the formed vapor through the porous membrane.

Collecting

In some embodiments, the methods of the present disclosure may also include a step of collecting the distillate. Various methods may be utilized to collect a distillate. For instance, in some embodiments, the distillate may be collected by flow through a channel (e.g., channel 26 in FIG. 1B) and into a container (e.g., container 30 in FIG. 1B). In some embodiments, the distillate can be collected by a liquid flow, an air flow, or a vacuum. In some embodiments where the distillate is collected by an air flow or a vacuum, the vapor in the gas phase is condensed using a heat exchanger.

Distillation Methods

The methods and systems of the present disclosure may be applied to various distillation methods. For instance, in some embodiments, the distilling occurs by a membrane distillation method. In some embodiments, the membrane distillation method includes, without limitation, direct-contact membrane distillation, air-gap membrane distillation, sweeping-gas membrane distillation, vacuum membrane distillation, and combinations thereof.

In some embodiments, the distilling results in fluid desalination. In some embodiments, the distilling results in fluid purification. In some embodiments, the distilling results in solvent separation. In some embodiments, the distilling occurs without heating of bulk fluid. In some embodiments, the distilling occurs by only heating the fluid near the surface of the porous membrane. In some embodiments, the distilling occurs without the use of electric energy.

Methods of Making Membranes

In some embodiments, the present disclosure pertains to methods of making the porous membranes of the present disclosure. In some embodiments, the methods of the present disclosure include a step of associating a surface of a porous membrane with a photothermal composition.

Suitable porous membranes were described previously. In some embodiments, the porous membrane includes, without limitation, polypropylene, polyvinylidene fluoride, polytetrafluoroethylene, polyethylene, polycarbonates, cellulose, and combinations thereof.

Suitable photo-thermal compositions were also described previously. In some embodiments, the photo-thermal compositions of the present disclosure include, without limitation, noble metals, semiconducting materials, dielectric materials, carbon-based materials, composite materials, nanocomposite materials, nanoparticles, hydrophilic materials, polymers, fibers, meshes, fiber meshes, hydrogels, hydrogel meshes, nanomaterials, and combinations thereof.

Various methods may be utilized to associate a surface of a porous membrane with photo-thermal compositions. For instance, in some embodiments, the porous membrane surfaces of the present disclosure can be associated with photo-thermal compositions by immobilization methods. In some embodiments, the association methods can include, without limitation, coating, spraying, drop-casting, dip-coating, covalent binding (e.g., in wet chemistry), polymer blend coating, covalent crosslinking, spinning, electrospinning, and combinations thereof. In some embodiments, the surfaces of the porous membranes of the present disclosure are associated with photo-thermal compositions by electrospinning the photo-thermal composition onto the surface of the porous membrane. In some embodiments, the photo-thermal composition is in the form of electrospun fiber meshes.

As also described previously, porous membranes can become associated with photo-thermal compositions in various manners. For instance, in some embodiments, the surface becomes associated with the photo-thermal composition through at least one of covalent bonds, non-covalent bonds, physisorption, hydrogen bonds, van der Waals interactions, London forces, dipole-dipole interactions, and combinations thereof.

In some embodiments, the photo-thermal composition becomes directly associated with the surface of the porous membrane. In some embodiments, the photo-thermal composition becomes embedded in a polymer layer coated on the surface (e.g., polymer layers such as polystyrenes, polyacrylonitriles, polymethyl methacrylates, polydopamine, and combinations thereof). In some embodiments, the nanoparticles become embedded in a hydrophilic material coated on the surface (e.g., hydrophilic materials such as polymers, meshes, fibers, mats, hydrogels, and combinations thereof). In some embodiments, the photo-thermal composition becomes cross-linked to the surface. In some embodiments, the surface becomes coated with the photo-thermal composition. In some embodiments, the photo-thermal composition becomes cross-linked within the coating.

Applications and Advantages

The methods and systems of the present disclosure provide numerous advantages. For instance, in some embodiments, the photo-thermal compositions of the present disclosure can generate heat from light sources such as sunlight and thereby create a high temperature at the membrane surface to drive the distillation process without using electricity or specialized equipment (e.g., heat exchangers, solar collectors, and the like). In addition, the temperature polarization can be reversed. Moreover, the temperature at the porous membrane surface can remain relatively constant throughout a flow channel. Therefore, the distillation systems of the present disclosure can be made larger for higher fluid distillation rates. Furthermore, since the feed can only be heated at the membrane surface, there is minimum residual heat in the brine.

As such, in some embodiments, the systems and methods of the present disclosure can greatly improve the energy efficiency of current membrane distillation processes by using sunlight as the energy source, and maximizing sunlight absorbance and photo-thermal conversion, as well as reducing heat loss through brine discharge. Moreover, the systems and methods of the present disclosure can increase fluid recovery of a single pass membrane distillation unit by allowing longer feed channel and hence larger membrane size.

The aforementioned improvements overcome several barriers of current membrane distillation technologies. For instance, the capability of photo-thermal compositions of the present disclosure to heat fluids (e.g., feed water) makes it possible to operate solar membrane distillation without the need for a solar collector or any heat exchanger. This is expected to greatly reduce the overall complexity and capital cost of the systems and methods of the present disclosure, thereby making them good candidates for providing purified water at remote locations where electricity and safe water supply are not available.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Enhancement of the Energy Efficiency of Direct Solar MD Processes

In this Example, Applicants utilize the high photo-thermal efficiency and the localized heating of selected nanomaterials (NMs) to enhance the energy efficiency of the direct solar membrane distillation (MD) process (i.e., no solar collector or heat exchangers). At high nanoparticle (NP) concentrations, multiple scattering by neighboring NPs concentrates photons and increases light absorption (FIG. 2B).

High concentrations of photo-thermal NPs immobilized on MD membrane surfaces (feed side) can serve as efficient localized heat sources when irradiated by sunlight. The localized heating creates higher temperature on the membrane surface ($T_1$) than the feed water ($T_f$), and hence increases water vapor flux without significantly heating the bulk feed water. This process is expected to have higher energy efficiency than existing solar thermal MD processes, which create the needed temperature difference by heating the whole volume of the feed water, although only a fraction of it is converted to the clean, permeate water. The high local temperature at the membrane surface reverses temperature polarization (FIG. 2B). Therefore, the high flow rate required to enhance heat transfer in the feed channel in order to minimize temperature polarization is no longer necessary. Furthermore, with the modified membrane, heat is generated at the whole membrane surface, which effectively alleviates the diminished temperature difference along the membrane length, and enables possibility for larger scale MD modules.

Example 2. Preparation and Characterization of MD Membranes with Photo-thermal Compositions Photo-thermal nanocomposite membranes can be created by 1), directly coating the photo-thermal NMs on the surface of MD membranes, or 2), by incorporating the NMs in a polymer layer which sits on top of the MD membrane. The advantage of using an additional polymer layer is to achieve higher coating density of the photo-thermal NMs. Depending on the type of NM used, different coating/incorporation methods are needed to ensure proper attachment and concentration of the NMs while maintaining other important properties of the membrane, such as high surface hydrophobicity, low thermal conductivity, and high porosity. Because $SiO_2$/Au nanoshells and carbon black (CB) NPs are smaller than the membrane pore sizes, and because both Au/$SiO_2$ nanoshells and oxidized CB NPs are very hydrophilic, a consideration in choosing a coating method is prevention of NM penetration into membrane pores. Penetration of the NMs into the membrane pores may not only lead to a decrease in porosity and hydrophobicity of the pores, but also the heating of the whole membrane matrix, which in turn may cause a decrease in a trans-membrane temperature difference.

Figure 3:
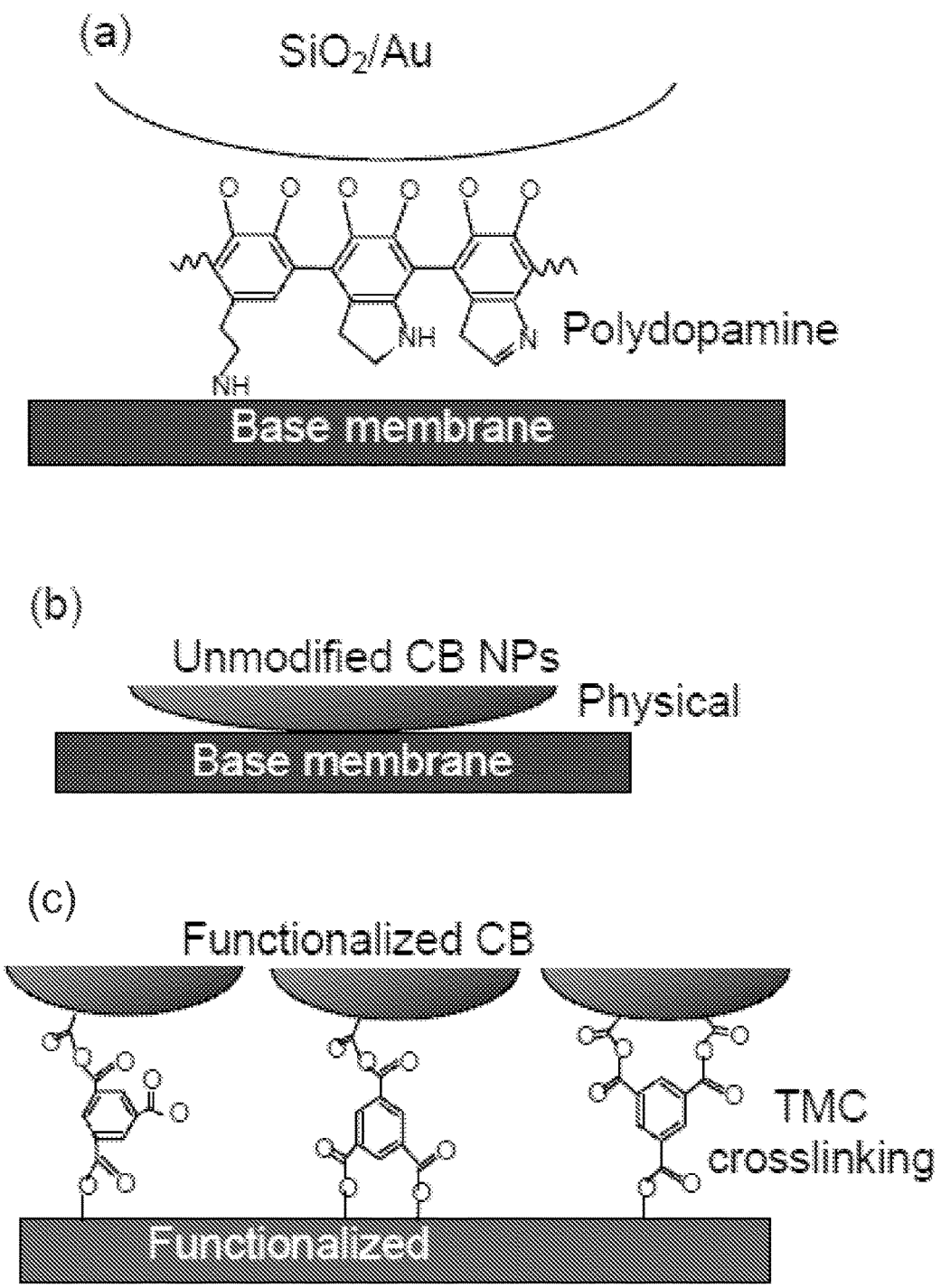
FIG. 3 shows examples of physical and chemical methods for attachment of photo-thermal compositions to base membrane surfaces, including $SiO_2$/Au nanoparticles (FIG. 3A), unmodified carbon black nanoparticles (CB NPs) (FIG. 3B), functionalized CB NPs (FIG. 3C), and cross-linked graphene oxide (GO) (FIG. 3D). The electrospinning scheme illustrated in FIG. 6 can be utilized to apply the photo-thermal compositions to base membrane surfaces.

Example 2.1. Coating of Photo-thermal Nanomaterials on Polydopamine Modified MD Membranes A polydopamine coating can be used to facilitate adhesion of certain photo-thermal NMs on the membrane surface (FIG. 3A). Polydopamine can effectively coat a wide range of substrate surfaces, and the catechol groups in polydopamine has high binding affinity to metals. This allows attaching photo-thermal NMs with metal surface on various base membrane surfaces without the need for functionalizing the base membranes. This feature is particularly attractive for PTFE or PVDF membranes, whose surfaces are highly chemically inert. The candidate NMs for this coating approach can include, without limitation, noble metal NPs, such as gold NPs; and core-shell structure NMs, such as $SiO_2$/Au nanoshells, $SiO_2$/Au nanorods, and the like.

The base membrane samples can be mounted on a glass slide with the active layer facing up to protect the back side of the membrane from contacting the coating solution. Coating can be achieved by a simple soaking method or dip coating method. The dry membrane sample can first be exposed to a dopamine solution buffered at pH~8.5. The polydopamine-coated membrane can be dried and then exposed to a photo-thermal metal NM suspension. The immersion time, the dipping speed, number of dip cycles as well as dopamine and nanoshell concentrations can be tested and optimized to achieve uniform coatings of different nanoshell surface loadings while avoiding dopamine penetration and nanoshell deposition in the pores.

Preliminary tests with a 0.2 µm PVDF membrane showed notable decrease in membrane surface hydrophobicity after soaking in dopamine solution for 15 minutes. However, no pore flooding was observed in the DCMD experiments using the composite membranes prepared. This suggests that, by limiting contact time with dopamine, one can limit the polydopamine coating on the membrane surface but not in the membrane pores.

Example 2.2. Direct Coating of Photo-Thermal NMs on MD Membranes

Typical MD membranes are preferably hydrophobic. Thus, photo-thermal NMs that are hydrophobic in nature can adhere well to MD membrane surfaces through strong van der Waals forces (FIG. 3B). Drop casting, spin coating and dip coating can be used for attaching the hydrophobic photo-thermal NMs on the membrane. The candidate photo-thermal NMs can include, without limitation CB NPs or reduced GO.

Because hydrophobic NMs may not disperse in water, a suitable solvent is needed. The solvent desirably allows good dispersion of the NMs, but no penetration of CB NPs into membrane pores. It is also desirable for the solvent not to damage the membrane material. Although PVDF and PTFE are highly resistant to most solvents, PP (which is also used as the support layer in PTFE membranes) is more subject to attack by solvents.

In preliminary studies, chloroform was used to disperse CB NPs. Chloroform disperses CB NPs very well. A simple soaking and evaporation protocol was able to provide good CB coating on a PTFE membrane. No significant detachment of CB NPs was observed, even when physical scrubbing was applied to the modified membrane surface. However, chloroform can wet PTFE and PVDF membranes and hence allow penetration of CB into membrane pores. It can also damage PP at prolonged contact time. Therefore, it is desirable for the solvent and contact time to be carefully chosen to avoid compromising the base membrane integrity.

Example 2.3. Coating of Photo-thermal NMs via Covalent Bonding

Covalent bonding can be used to tether the photo-thermal NMs onto a porous membrane surface, if there are suitable functional groups present on both the membrane and the photo-thermal NMs. Typical MD membranes do not have suitable functional groups on the surface. However, functionalization of —OH on PVDF, PTFE and PP membrane surfaces can be achieved through plasma treatment. Wet chemical oxidation, in KOH and $KMnO_4$ solutions for HF-elimination followed by nucleophilic addition in $H_2SO_4$ and $NaHSO_4$ solutions, can also be applied on PVDF membranes to introduce —OH functional groups. Alternatively, polydopamine coating can be applied to introduce functional groups on MD membranes as well. Photo-thermal NMs candidates include, without limitation, carboxylated CB NPs and GO. Carboxylation of CB NPs can be achieved through oxidation in nitric acid or hydrogen peroxide under heated conditions.

Figure 3D:
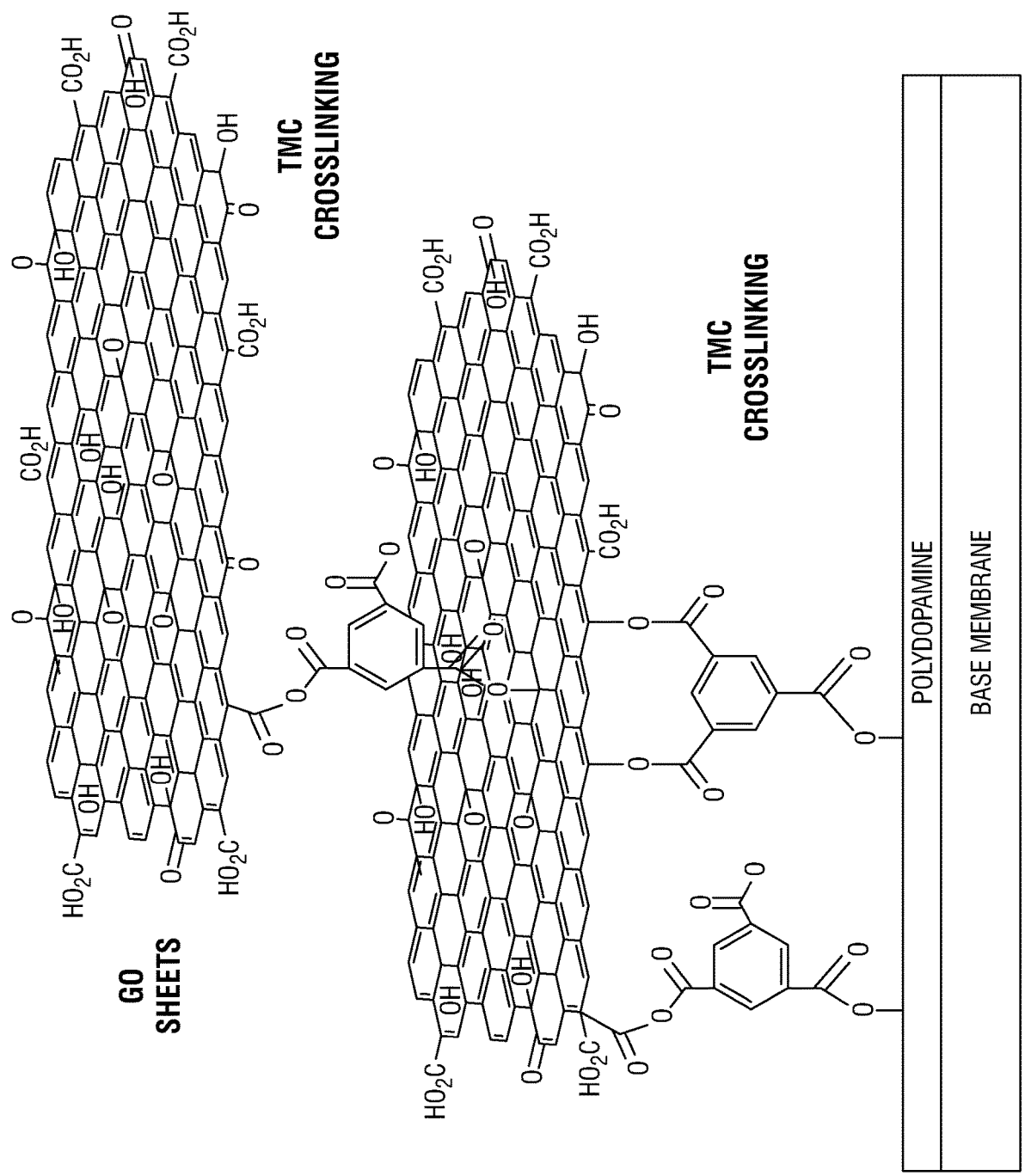

A crosslinker is preferred to link the functional groups between the photo-thermal NMs and the porous membrane surface. Crosslinkers that can be used include, without limitation, trimesoyl chloride (TMC). A TMC solution in isoparaffin-G can first be contacted with the functionalized membrane surface, during which time, TMC reacts with the —OH or —COOH groups on the membrane. The TMC grafted membrane can then be soaked in GO or carboxylated CB NP suspension in THF to allow reaction between the functional groups on the NM and the —C=O on TMC (FIG. 3C). Specifically for the case of GO, due to its two-dimensional structure, multiple layers of coatings can be achieved by alternatively applying the crosslinker and GO suspensions onto the membrane surface to add additional layers (FIG. 3D). Coating density can be varied by changing the membrane modification conditions (e.g., plasma treatment time), CB concentration in the suspension, and contact time with the CB suspension.

Example 2.4. Incorporating Photo-thermal Compositions in Additional Porous Polymer Layers Photo-thermal NMs can be dispersed in a polymer-solvent mixture, and then coated on the MD surface as an extra polymer composite layer via techniques such as electrospinning. The type of polymers to choose should have minimal light absorbance. Candidates include, without limitation, acrylonitrile, polymethyl methacrylate, polyethylene oxide, poly(vinyl alcohol), and the like. The photo-thermal NM-polymer-solvent mixture is then applied to the membrane surface by electrospinning. Photo-thermal NM candidates include, without limitation, noble metal NPs, noble metal core-shelled structured NMs, and carbon based NMs, such as CB NPs, and GOs.

Besides coating an additional composite layer with the photo-thermal NMs in the fibers of the polymer, the photo-thermal NMs can also be coated on or embedded in a pre-synthesized macro-porous polymer film (or polymer mesh), and then applied to the surface of the MD membrane. Polymers for the mesh preferably have minimal light absorbance. Potential candidates include, without limitation, acrylonitrile, polymethyl methacrylate, polyethylene oxide, poly (vinyl alcohol), and the like. Similar coating methods, such as polydopamine coating and covalent binding, can be used to coat the photo-thermal NMs on the chosen polymer mesh.

Example 2.5. Use of Graphene Oxides as Photo-thermal Compositions

Graphene oxide (GO) nanosheets are quite hydrophilic and disperse well in water. Therefore, they are preferably attached to base membrane surfaces via covalent bonds to prevent release of GO from the membrane surface. The same grafting methods used for CB NPs described above can be used for GO, in which —COOH and —OH groups on GO react with TMC grafted on base membrane surfaces (FIGS. 3C-3D). In this approach, Applicants only utilize the photo-thermal property of GO. Therefore, the orientation of the GO sheets, number of GO sheets in the coating layer, and the inter-sheet distance do not need to be controlled.

GO film's high water permeability is also an advantage. Typically, the MD membrane pore size is chosen by considering the trade-off between water vapor permeability and membrane wetting. Membranes with smaller pores have higher liquid entry pressure, but lower water vapor permeability. It has been shown that a membrane consisting of stacked GO sheets with inter-sheet distance between 6 and 10 Å allows water vapor to permeate through the nanocapillary network formed by the space between GO sheets almost unimpeded in the form of a highly ordered monolayer, where other vapors or gases cannot penetrate. This makes GO an optimal photo-thermal composition for MD membranes. GO has the potential to provide high water permeability and very importantly, volatile organic contaminant removal, which cannot be achieved by existing MD technology. However, fabrication of free-standing GO membranes of large dimensions cannot be achieved with existing technology.

In this Example, Applicants can fabricate nanocomposite membranes by forming the GO film on a porous support membrane. This can allow membranes with large pore sizes (e.g., a few micrometers) and even hydrophilic materials to be used for MD. Because an intact, individual GO sheet is not permeable to water and the inter-sheet capillary pressure is extremely high (estimated to be up to 1000 bar), wetting is not expected to be a concern. PVDF (Durapore SV), polycarbonate (Isopore TT, isopore TS), and mix cellulose ester (type RA and SS) membranes with pore sizes from 1 to 5 µm (Millipore) can be tested as candidate support membranes.

GO coatings of a stacked structure can be obtained using three different approaches: spin coating, flow-directed assembly by filtration, and layer-by-layer assembly with crosslinking. The first two methods have been used to prepare free-standing GO membrane or paper. However, it is expected that the interactions between the hydrophilic GO and hydrophobic base MD membrane may be too weak to form strong attachment. To address this, the base membrane can be coated with polydopamine and reacted with TMC to provide covalent bonding between the membrane and the GO coating. As the inter-sheet distance d is important to the water permeation rate, it can be tuned by heat annealing and chemical reduction using hydrazine.

It has been reported that long-term immersion in water may lead to expansion of inter-sheet space and potential salt penetration and dispersion of GO. Therefore, the long-term stability of the GO coating can be investigated at different temperatures and under various solution conditions (i.e., pH, salinity, and divalent cations).

To enhance long-term GO coating stability, layer-by-layer assembly with crosslinking can be used. In this method, TMC can be used to provide binding of the GO layer to the polydopamine coated support layer as well as to cross-link GO sheets (FIGS. 3C-3D).

To properly align GO-sheets, each layer of GO can be deposited by spin coating followed by reaction with TMC. It is expected that the inter-sheet distance d can depend on the degree of cross-linking, which can be tuned by partial reduction of GO and adjusting the concentration of TMC. This approach has been used to deposit up to 50 layers of GO on a polysulfone membrane. However, in previous studies, significant convective flow of water through the GO-polysulfone membrane was observed at 50 psi. This suggests wetting of the GO coating, and is contrary to the calculated extremely high capillary pressure and the observation that pressure did not affect water permeation through a GO membrane. Without being bound by theory, it is envisioned that such discrepancy is attributed to the difference in the GO membrane/coating thickness and structure resulting from the difference in the preparation methods used, or the presence of coating defects.

GO membranes have also been prepared by spin coating, during which the strong shear aligns the GO sheets to form a ordered, stacked structure. GO layers have also been assembled using a submersion protocol, during which randomly oriented GO sheets were quickly cross-linked by TMC. The GO coating was also much thinner (50 layers vs. 0.1-10 μm) and hence more likely to have defects.

To properly align GO-sheets, each layer of GO can be deposited by spin coating followed by reaction with TMC. It is expected that the inter-sheet distance d can depend on the degree of cross-linking, which can be tuned by partial reduction of GO and adjusting the concentration of TMC.

Example 3. Assessment of Photo-thermal Membrane Performance

Figure 4:
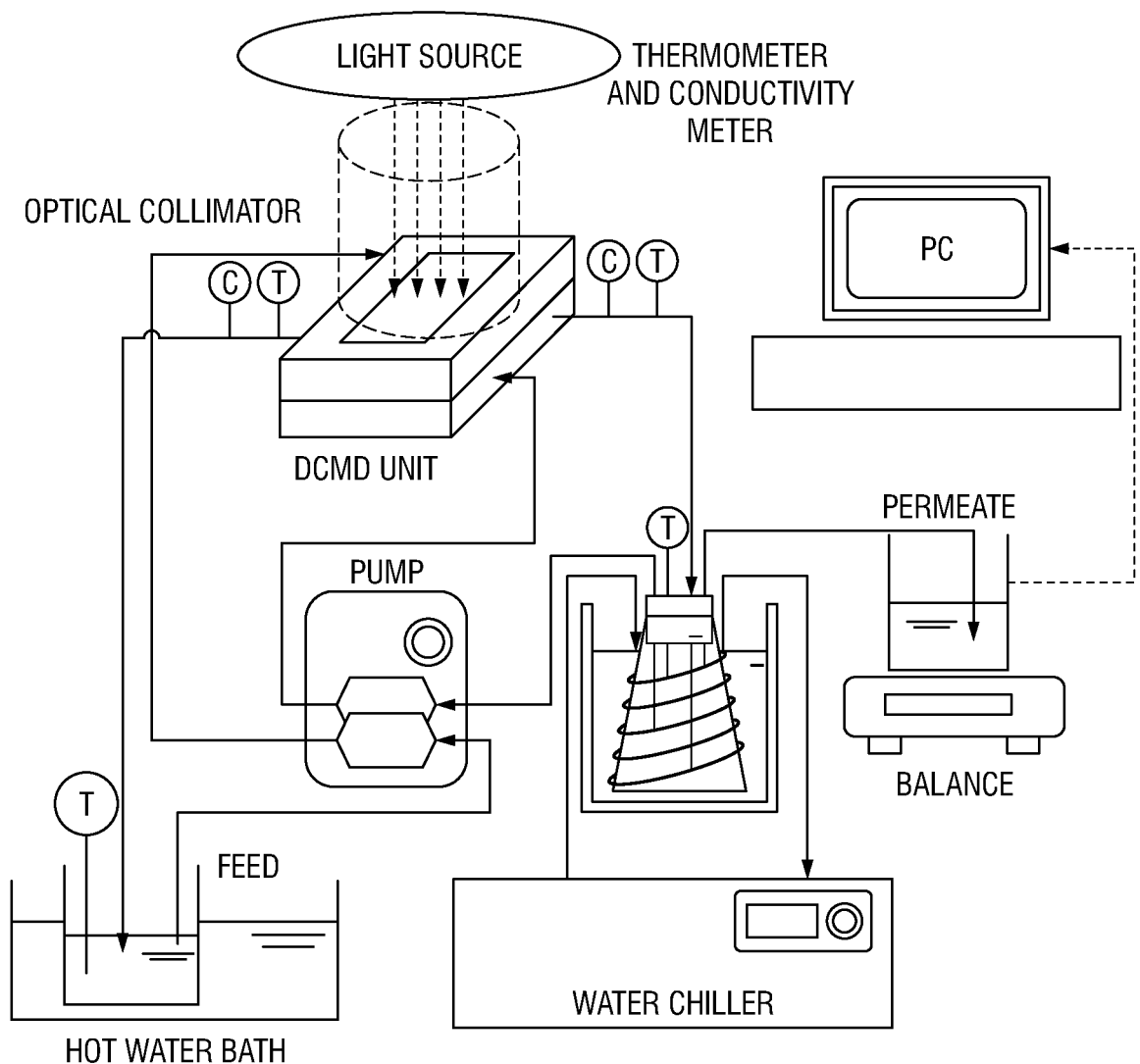
FIG. 4 shows a diagram of a direct contact membrane distillation (DCMD) experimental setup.

In this Example, Applicants assessed the performance of various photo-thermal membranes by utilizing the bench scale solar MD system shown in FIG. 4. The bench scale system uses a direct contact membrane distillation (DCMD) configuration. The DCMD unit houses a flat sheet membrane with an effective area of 28.27 cm$^2$ (8.10 cm×3.49 cm). The feed and permeate flow channels are both 0.3 cm in height. A quartz window of 6.98 cm×3.49 cm allows irradiation of the membrane surface. Glass fiber sheets with aluminum coating are applied to the surface of the DCMD unit except for the quartz window to minimize heating of the unit itself from the irradiation as well as heat loss to the environment. The whole unit is placed in a lab-made solar simulator, with an optical collimator installed between the light source and the quartz window to minimize diffusive light. Simulated sunlight was provided by halogen tungsten lamps (FEIT MR16/GU10 120V 50W xenon) with the irradiation intensity adjusted by varying the number of lamps.

A peristaltic pump that circulates the feed and permeate flows through the DCMD unit, the temperatures of which are maintained by two heating/chilling water baths with continuous monitoring of temperature. All tubings and connectors are wrapped with insulating materials to minimize heat exchange with the environment. An overflow design of the cold flow reservoir is used to collect the distillate, and a bench-top digital balance monitors the accumulative mass of the distillate, from which water vapor flux through the membrane can be determined. A flow through micro conductivity cell is installed on the concentrate permeate lines to continuously monitor permeate conductivity.

Liquid entry pressure (LEP) measurements were carried out on all of the membrane samples in this Example. LEP determines how much pressure is needed to push water through the tested membrane. It is an important parameter in the MD process to indicate the ability of the membrane to serve as the barrier between the feed and permeate liquid. LEP measurements were done by observing the protrusion of water through the tested membrane by gradually increasing the applied pressure.

In this Example, experiments were carried out using a commercial PVDF membrane (0.2 μm pore size), commercial nylon meshes (7 μm pore size), SiO$_2$/Au nanoshells (~150 nm in diameter, 120 nm SiO$_2$ core), and CB NPs (Cabot, Inc., Billerica, Mass.). The base PVDF membrane and the NM modified membranes were tested in a bench scale direct contact membrane distillation (DCMD) system with simulated solar irradiation (FIG. 4). The feed solution used was 1% NaCl, and the permeate was pure water. The feed and permeate temperatures were maintained at 30±0.1° C. and 20±0.1° C., respectively. Simulated sunlight was provided with six halogen tungsten lamps (FEIT MR16/GU10 120V 50W xenon). Further details of the modification methods and results are summarized herein.

Example 3.1. Coating of SiO$_2$/Au Nanoshells on Polydopamine Coated PVDF Membranes For coating of SiO$_2$/Au nanoshells, PVDF base membrane was exposed to 2 mg/ml dopamine chloride solution buffered at pH~8.5 with 10 mM Tris-HCl for 15 minutes. The membrane was dried in air and then exposed to an aqueous SiO$_2$/Au nanoshell suspension of ~4.5×10$^9$ particles/ml for 30 minutes. The membrane was then dried in an oven at 60° C. for 2 hours and thereafter rinsed thoroughly with pure water.

Figure 9:
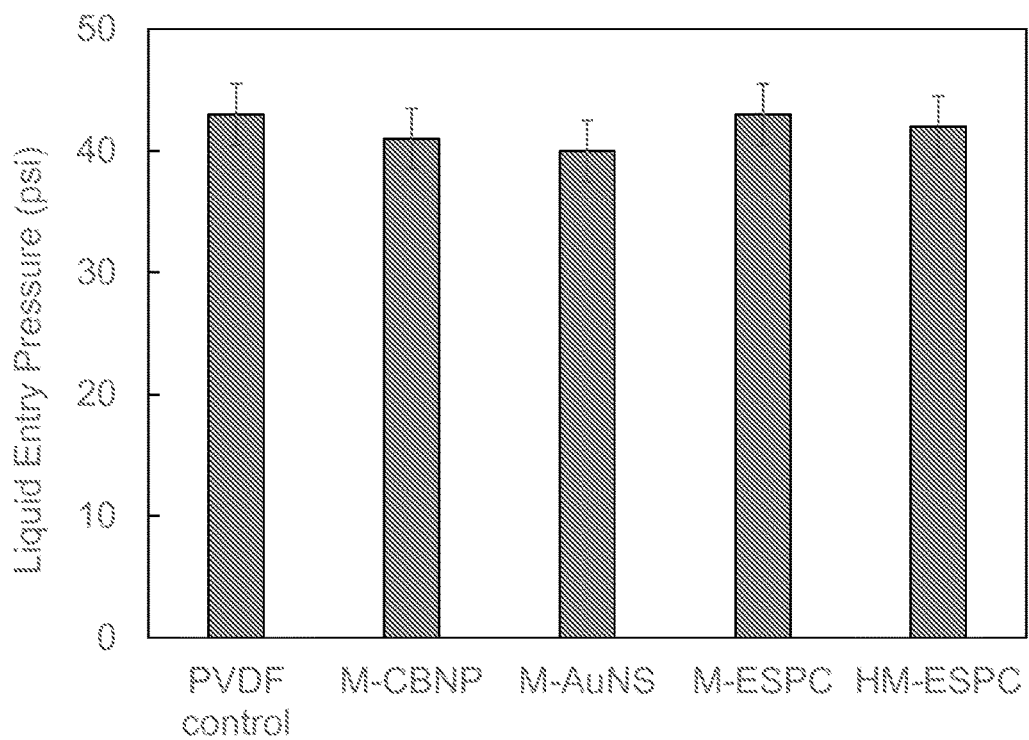
FIG. 9 shows liquid entry pressure (LEP) measurements of different membrane samples. Error bars are the maximum possible error from the precision of the pressure gauge (2.5 psi).

FIG. 9 summarizes the LEPs of various membranes before and after modification. The results indicate that, after the coating of SiO$_2$/Au nanoshells, the LEPs did not change significantly, and the membrane can still effectively serve as the liquid barrier in MD applications.

Figure 5A:
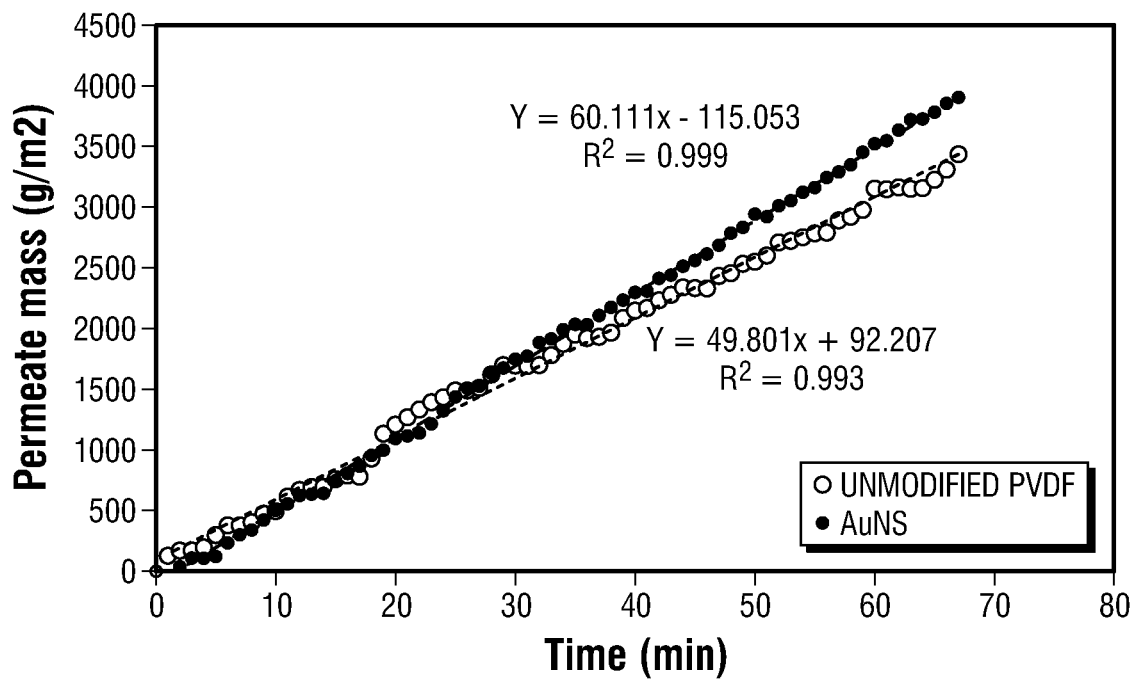
FIG. 5 shows a change of permeate mass over time for various polyvinylidene fluoride (PVDF) membranes, including a nanomaterial (NM) coated PVDF membrane (FIG. 5A), a PVDF membrane with an unmodified nylon mesh and NM coated meshes (FIG. 5B), and a base PVDF membrane with an electro-spinning coated (polymethyl methacrylate) PMMA/CB NP polymer layer (FIG. 5C).

FIG. 5A summarizes the performance of the base PVDF membrane, as well as the SiO$_2$/Au nanoshells coated PVDF membranes under light irradiation conditions. FIG. 5A plots the increase in permeate mass in the unit of mass per unit area of membrane (g/m$^2$). The slopes of the curves represent the permeate flux (g/m$^2$-min). The SiO$_2$/Au nanoshell coated membrane has a flux of 60.11 g/m$^2$-min, 20.7% higher than the base membrane flux of 49.81 g/m$^2$-min. Overall, the aforementioned results demonstrate an increase in the slopes of the modified membranes when compared with the base membrane.

Example 3.2. Coating of CB NPs on PVDF Membrane

For coating of CB NPs, the membrane surface was exposed to 0.1 wt % CB NPs in chloroform for 1 minute. Then the suspension was removed and the residual solvent on the membrane was allowed to dry. The obtained membrane was then thoroughly rinsed with pure water.

FIG. 9 summarizes the LEP before and after modification. The results indicate that, after the coating of CB NPs, the LEP did not change significantly and the membrane can still effectively serve as the liquid barrier in MD applications.

Figure 5B:
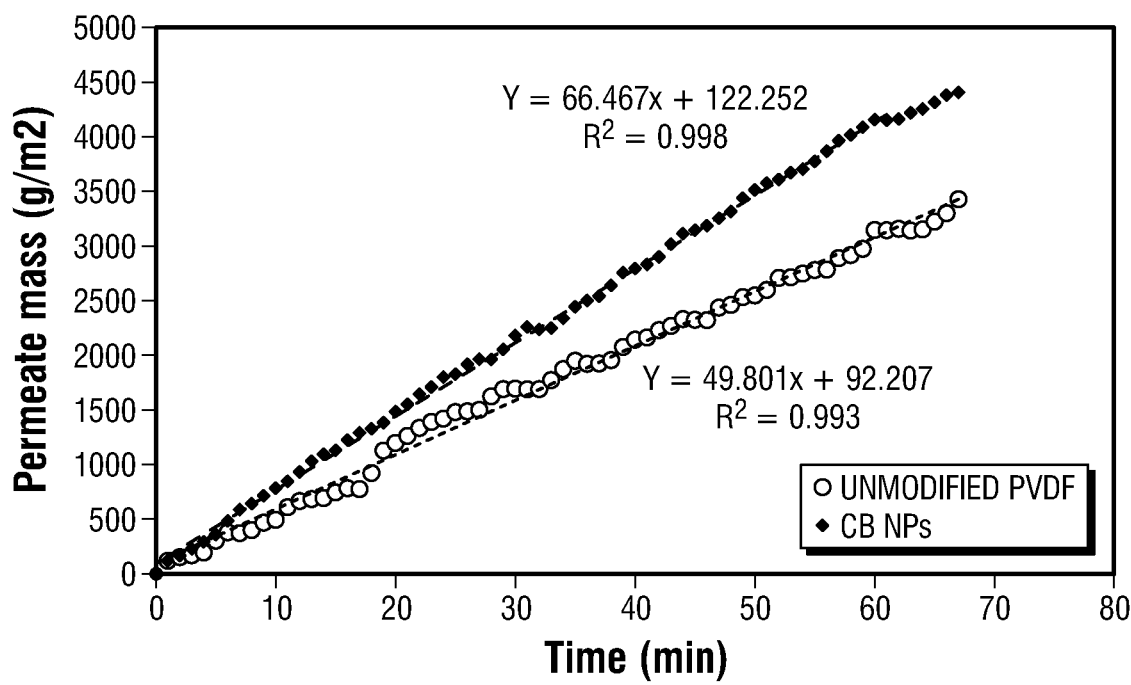
Figure 5C:
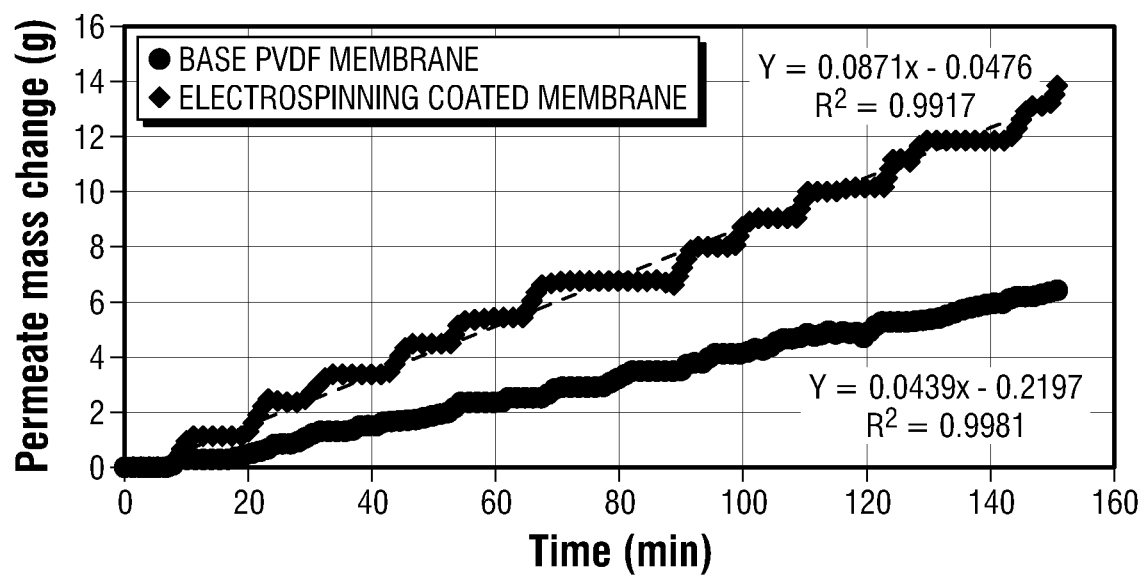

FIG. 5B summarizes the performance of the PVDF membrane as well as the CB NP coated membrane. After coated by CB NPs, the membrane had a 33.5% increase in flux compared to the membrane with the unmodified PVDF membrane (66.467 g/m$^2$-min vs. 49.801 g/m$^2$-min).

Example 4. Electrospinning of CBNP-polymer Nanofibers

In this Example, Applicants demonstrate the fabrication of carbon black nanoparticle (CBNP)-polymer nanofibers through electrospinning, and the utilization of the CBNP-polymer nanofibers as photo-thermal compositions. This Example provides a new modification method for using electrospinning coating to form porous membranes. This is an example in parallel to the two examples included in Example 3.1 (AuNS coated membranes) and Example 3.2 (CBNP coated membranes).

Example 4.1. Electrospinning of CBNP-polymer Nanofibers

Figure 6:
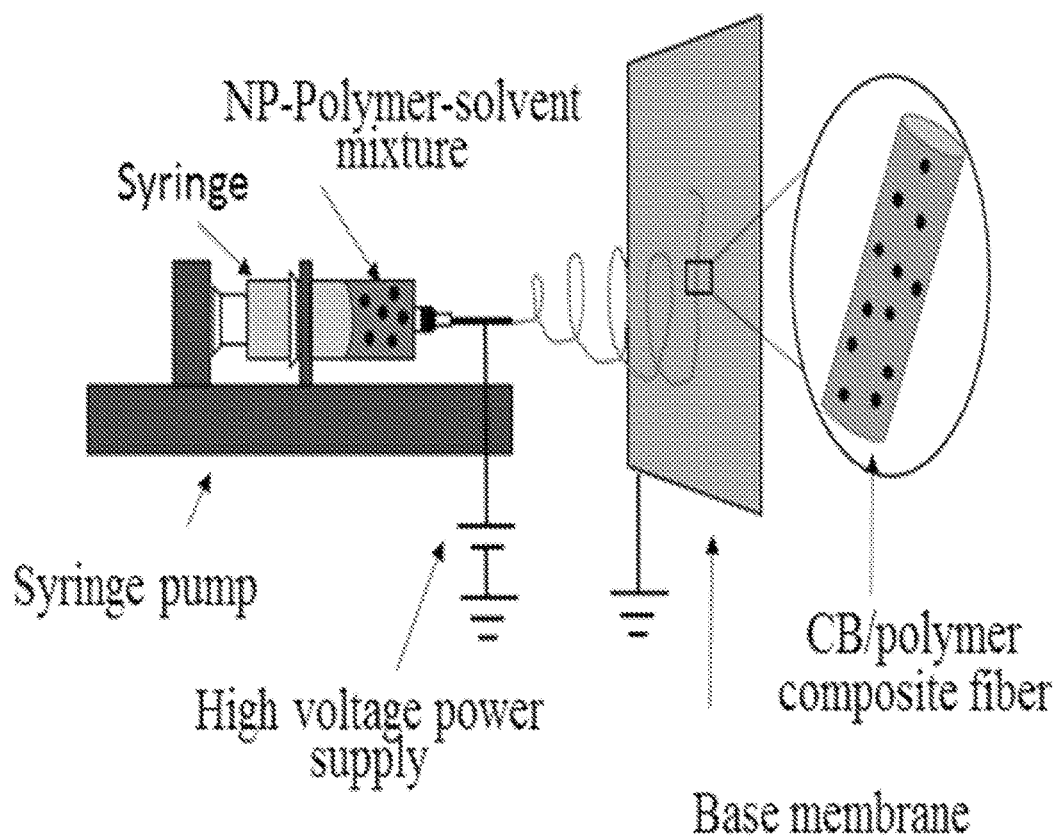
FIG. 6 shows an illustration of an apparatus for electro-spinning a photo-thermal composition onto a porous membrane to form a photo-thermal nanocomposite fiber mesh.

An electrospinning scheme illustrated in FIG. 6 was utilized to create CBNP-polymer nanocomposite fibers with CBNPs trapped within the polymer matrix. Two types of polymers were used in the electrospinning process: poly (methyl methacrylate) (PMMA); and poly(vinyl alcohol) (PVA).

Electrospinning of the PMMA-CBNP composite was carried out using 20 wt % PMMA in Dimethylformamide (DMF) containing 0.5 wt % CBNP. The CBNP/PMMA mixture was mixed overnight and sonicated for 10 minutes before electrospinning on the unmodified PVDF membrane.

The electrospinning was run at 15 kV applied voltage at an injection rate of 1.5 mL/hour with the needle to a substrate distance of ~15 cm. A total of 1 mL of injection volume was used for all the electrospinning experiments. For abbreviation, "electrospun PMMA" (with no CBNP) and "electrospun PMMA-CBNP" fiber mesh coated membranes were designated as "M-ES" and "M-ESPC", respectively.

Electrospinning of the PVA-CBNP composite was carried out using 13 wt % PVA in water. The PVA was modified with a styrylpyridinium group to allow for UV crosslinking of the fibers, providing stability in water. CB NP at 2 wt % concentration was dispersed in PVA solution using sonication (35 W) for about 3 hours. Prior to electrospinning, the base PVDF membrane was coated with a thin layer of polydopamine (2 mg/mL, pH 8.5, 15 minutes) to allow for strong adhesion between the hydrophobic PVDF and the hydrophilic PVA polymer fibers.

The electrospinning was run at 10 kV and an injection rate of 0.35 mL/h. The distance between the needle and the substrate was ~10 cm. Electrospinning time was varied (5 minutes at 2 hr) to create fiber mats of different thickness. The membrane coated with electrospun PVA hydrogel fibers (with no CB NP) and electrospun PVA hydrogel fibers with CB NP are designated as "HM-ES" and "HM-ESPC", respectively.

Example 4.2. Characterization

Figure 7:
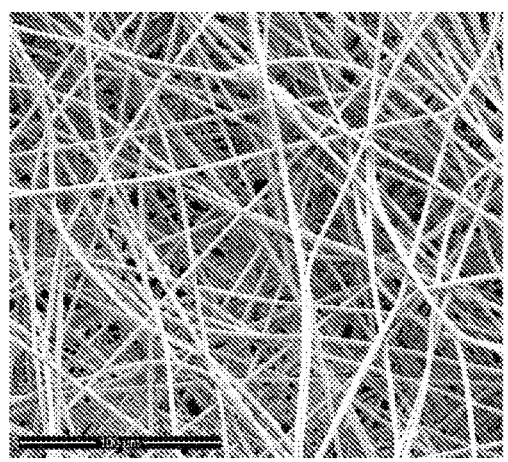
FIG. 7 provides scanning electron microscopy (SEM) images of the surface (FIG. 7A) and cross-section (FIG. 7B) of electrospun PMMA-CBNP fiber meshes (M-ESPCs). An SEM image of the surface of an electrospun poly(vinyl alcohol) (PVA) hydrogel fiber with CBNP (HM-ESPC) is also shown (FIG. 7C).
Figure 7:
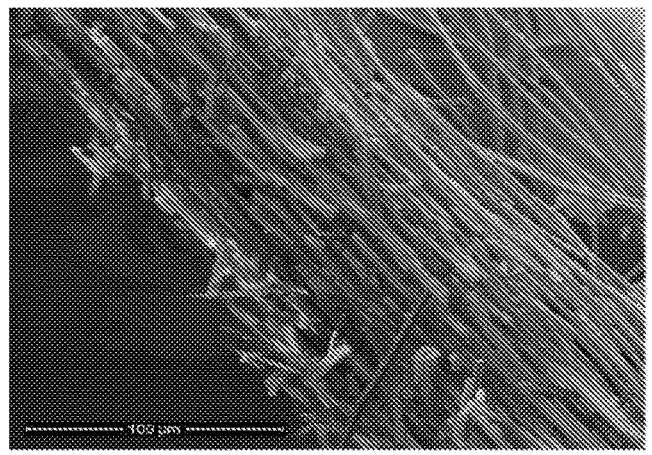
Figure 7:
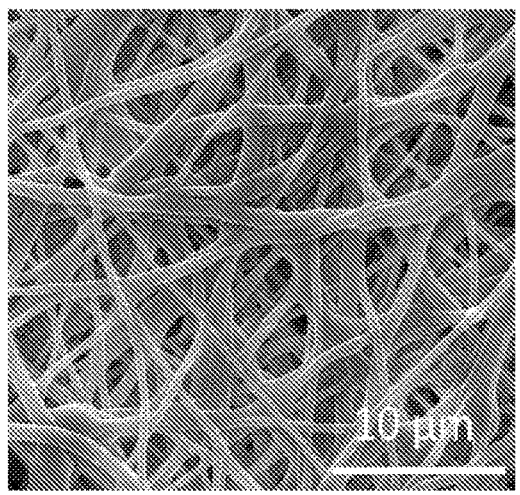

As shown in the SEM images in FIGS. 7A-C, well-woven layers of the nanofiber mesh were formed on the membrane surface for both polymer-CBNP combinations. The diameter of the fibers were fairly uniform.

Figure 8:
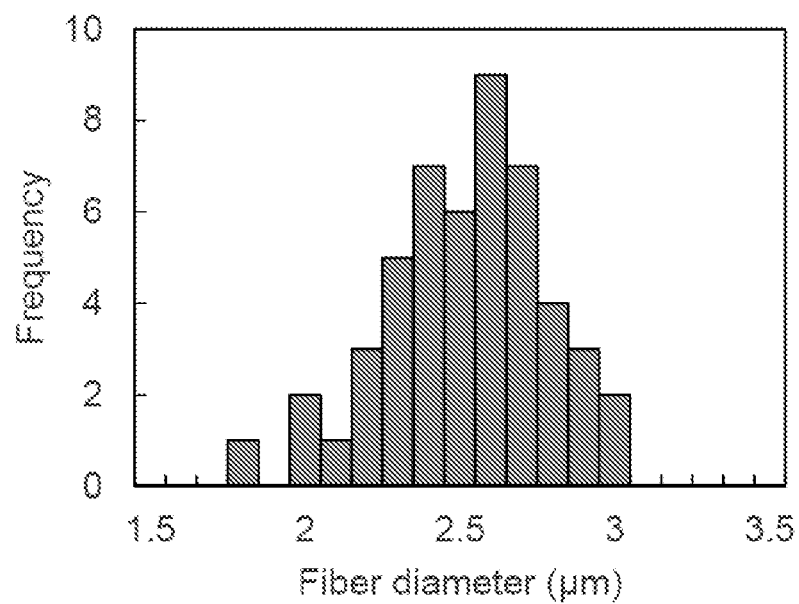
FIG. 8 shows data relating to various fiber diameters.
Figure 8:
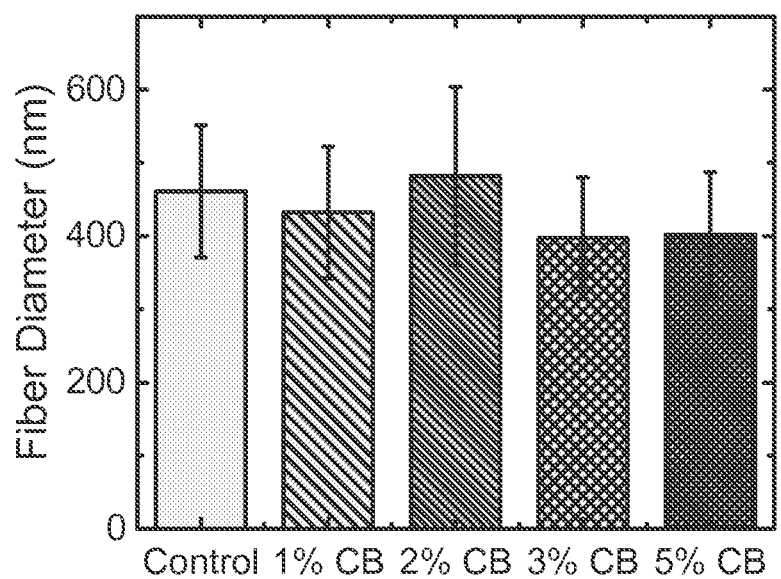

The histogram of the PMMA-CBNP fiber diameters (FIG. 8A) showed a median of 2.5 µm and an average of 2.47 µm. The thickness of the coated mesh layer was ~100 µm, as characterized by the cross-section image in FIG. 7B. Fiber diameter of the PVA-CBNP were comparatively much smaller, generally 400-450 nm (FIG. 8B).

Figure 11:
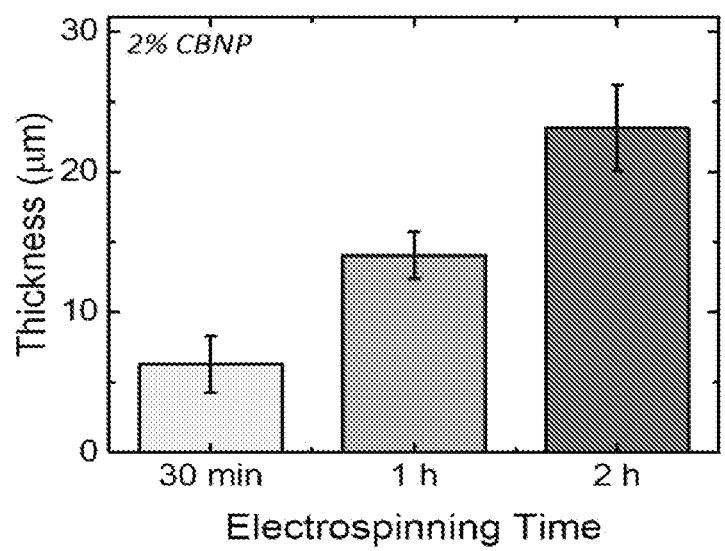
FIG. 11 shows data indicating that HM-ESPC coating thickness increases with electrospinning time.
Figure 12:
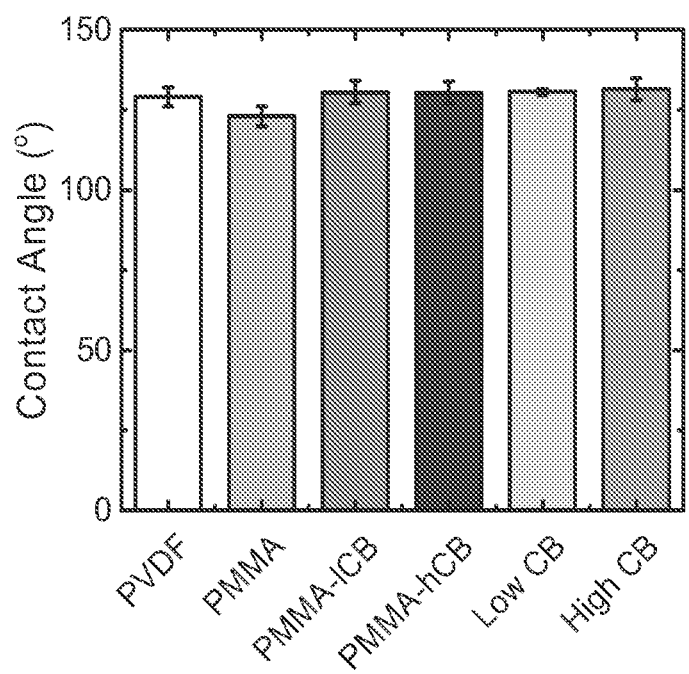
FIG. 12 shows data relating to deionized water contact angle measurements on membranes modified with hydrophilic electrospun fibers.
Figure 12:
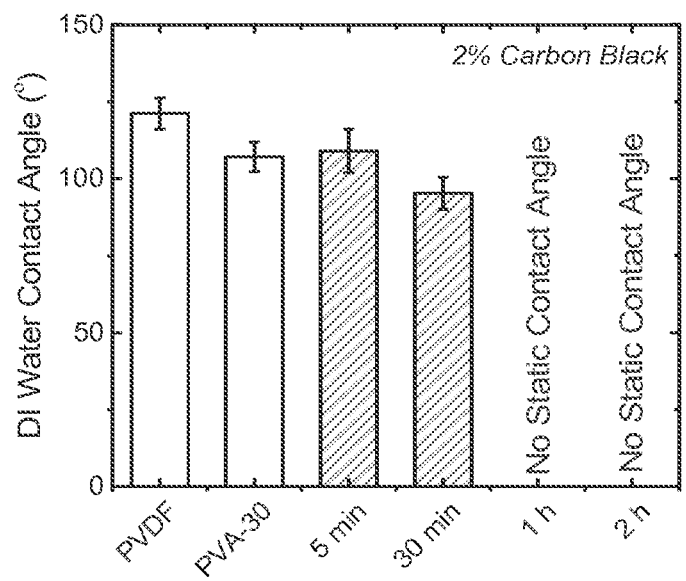

Different concentrations of CB NP in the PVA solution were also tested and they did not seem to vary the fiber diameter significantly. Coating thickness of PVA-CBNP layer increased with electrospinning time. An electrospinning of about 2 hours resulted in a coating thickness of 24 µm (FIG. 11). Deionized water contact angle measurements showed that membranes modified with hydrophilic PVA fibers (FIG. 12B) were much more hydrophilic than membranes modified by hydrophobic PMMA fibers (FIG. 12A). Moreover, Applicants observed that PVA fiber mats of sufficient thickness wet completely.

XPS analyses were carried out on the M-ESPC. The results are summarized in Table 1. Theoretical carbon and oxygen concentrations and ratio in PMMA are included in Table 1 for comparison. Table 1 shows that carbon percentage and C/O ratio in the fibers increased with the addition of CBNP, suggesting successful incorporation.

TABLE 1

Elemental compositions of the PMMA and M-ESPC samples.

| Samples | C | O | C/O |
|---|---|---|---|
| PMMA (theoretical) | 71.42% | 28.57% | 2.5 |
| M-ESPC | 75.49% | 24.51% | 3.1 |

FIG. 9 shows that the LEP of the membrane was the same before and after the coating of the electrospun mesh, suggesting that the membrane will function well as liquid barrier in MD.

The performance of the electrospun polymer-CBNP modified membranes were tested in the experimental setup shown in FIG. 4, with adjustments in feed temperature (now 35° C.) and feed and permeate channel height (now 0.2 cm). Photo-thermal membranes described in Example 3.2 and 3.3 were also tested in this new setup for comparison. Such results are also summarized in FIG. 10.

Figure 10:
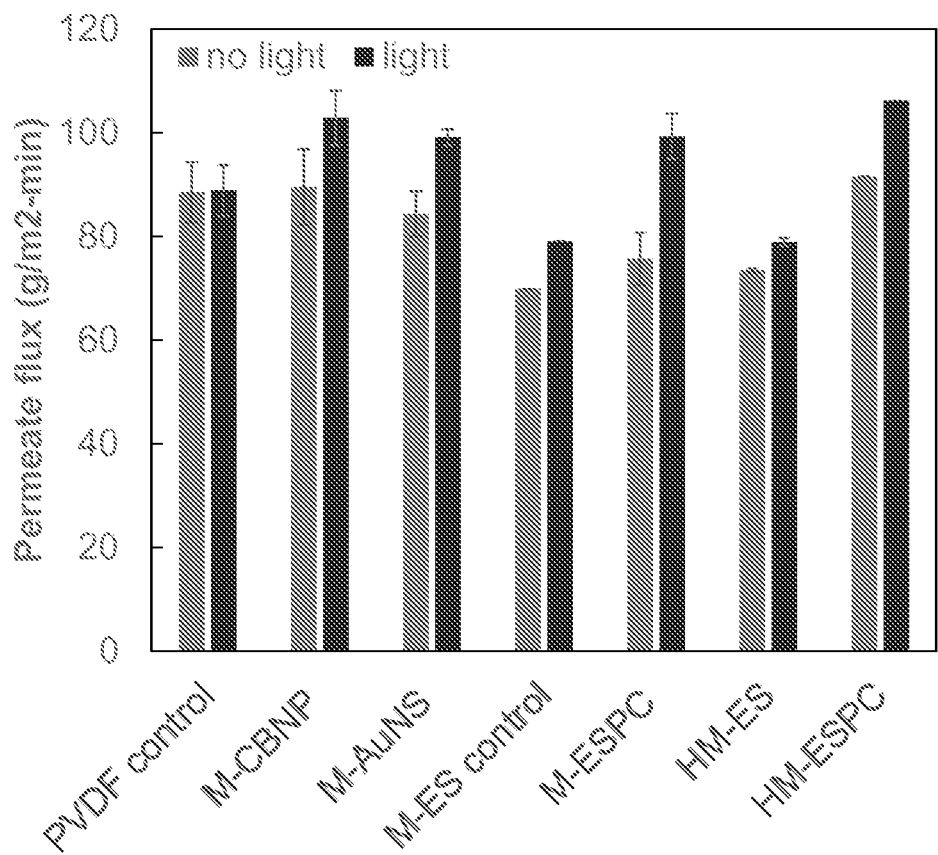
FIG. 10 shows permeate flux measurements of different membrane samples. The measurements are shown with and without light irradiance.

FIG. 10 summarizes the flux of the modified membrane. After coating of the photo-thermal mesh, the permeability of the membrane decreased, as shown by the decrease of flux of M-ESPC and HM-ESPC with no light. Without being bound by theory, it is envisioned that such results are likely due to the increase of vapor transport resistance by the additional hydrophobic photo-thermal mesh layer.

Without light, the M-CBNP samples and the M-AuNS samples had permeate fluxes comparable to those of the unmodified control, suggesting minimal alteration to membrane property. Reduced permeate fluxes were also observed on both the M-ES and HM-ES samples. The M-ES had a 21% decrease compared with the unmodified PVDF membrane. The HM-ES also showed similar decrease (17%) in flux. The effective coating created an additional layer, which could increase the resistance of vapor transport and cause low permeability.

After turning on the light, increased permeate flux was observed on most of the modified membrane samples. The M-CBNP had permeate flux of 102.8 g/m$^2$•min, a 14.52 g/m$^2$•min increase from the unmodified base membrane. The M-AuNS had a permeate flux of 99.1 g/m$^2$•min, which represented a 10.6 g/m$^2$•min increase from the base membrane.

Flux of the M-ESPC samples were comparable to the M-AuNS samples (99.3 g/m$^2$•min), likely due to the extra resistance form the mesh coating. By comparing the flux of the samples with and without light, the increase from the M-ESPC was the highest at 23.6 g/m$^2$•min, suggesting that the coated ESPC meshes were very effective in photo-thermal conversion.

The HM-ESPC had the highest flux performance of all samples, with 106.2 g/m$^2$•min and a 17.6 g/m$^2$•min increase from the PVDF control. The findings show that embedding photo-thermal nanoparticles within a hydrophilic electrospun mat could decrease resistance to vapor and increase contact between the photo-thermal nanomaterials (e.g., CB NP), thereby enhancing their performance.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A system for distilling a fluid, wherein the system comprises:
   (a) a porous membrane,
       wherein the porous membrane comprises a surface,
       wherein the surface comprises a composition capable of generating heat,
       wherein the composition is selected from the group consisting of carbon-based nanomaterials, nanoparticles, and combinations thereof; and
       wherein the heat generated by the composition at the surface propagates the distilling of the fluid;
   (b) a housing surrounding the porous membrane,
       wherein the housing comprises glass fiber sheets, and
       wherein the glass fiber sheets further comprise a coating of aluminum; and
   (c) a window on the housing,
       wherein the window exposes the surface of the porous membrane to an environment.

2. The system of claim 1, wherein the fluid is selected from the group consisting of water, alcohols, organic solvents, volatile solvents, water-alcohol mixtures, and combinations thereof.

3. The system of claim 1, wherein the porous membrane is selected from the group consisting of polypropylene, polyvinylidene fluoride, polytetrafluoroethylene, polyethylene, polycarbonates, cellulose, and combinations thereof.

4. The system of claim 1, wherein the porous membrane comprises a microporous membrane.

5. The system of claim 1, wherein the porous membrane comprises pore sizes ranging from about 1 nm to about 5.0 µm in diameter.

6. The system of claim 1, wherein the surface spans an entire outer surface of the porous membrane.

7. The system of claim 1, wherein the temperature of the surface remains constant during distilling.

8. The system of claim 1, wherein the composition is capable of generating heat when exposed to a light source.

9. The system of claim 1, wherein the composition comprises a photo-thermal composition.

10. The system of claim 1, wherein the composition generates the heat at the surface by converting light energy from a light source to thermal energy.

11. The system of claim 1, wherein the composition is hydrophilic.

12. The system of claim 1, wherein the composition further comprises a polymer selected from the group consisting of hydrophillic polymers, hydrophobic polymers, polymer fibers, electrospun polymers, electrospun polymer fibers, functionalized polymers, and combinations thereof.

13. The system of claim 1, wherein the composition comprises carbon-based nanomaterials selected from the group consisting of carbon black, graphite, graphene, graphene oxide, reduced graphene oxide, carbon nanotubes, carbon nanofibers, nanosheets thereof, and combinations thereof.

14. The system of claim 1, wherein the nanoparticles are selected from the group consisting of metal nanoparticles, noble metal nanoparticles, metal oxide nanoparticles, semiconductor nanoparticles, gold nanoparticles, nanoshells, $SiO_2$/Au nanoshells, nanorods, carbon black nanoparticles, graphene nanoparticles, graphene oxide nanoparticles, reduced graphene oxide nanoparticles, plasmonic nanoparticles, light absorbing nanoparticles, and combinations thereof.

15. The system of claim 1, wherein the nanoparticles are in the form of an array on the surface.

16. The system of claim 1, wherein the nanoparticles are embedded in or attached to a hydrophilic material coated on the surface.

17. The system of claim 16, wherein the hydrophilic material comprises polymers, wherein the polymers are selected from a group consisting of meshes, fibers, mats, hydrogels, and combinations thereof.

18. The system of claim 1, wherein the composition is directly associated with the surface of the porous membrane.

19. The system of claim 1, wherein the composition is embedded in a polymer layer, and wherein the polymer layer is coated on the surface.

20. The system of claim 19, wherein the polymer layer is selected from the group consisting of polyvinyl alcohol, polyacrylate, polyvinylidene fluoride, polystyrenes, polyacrylonitriles, polymethyl methacrylates, polydopamine, and combinations thereof.

21. The system of claim 1, wherein the surface is associated with the composition through covalent bonds.

22. The system of claim 1, wherein the composition is cross-linked to the surface.

23. The system of claim 1, wherein the surface is coated with the composition.

24. The system of claim 23, wherein the composition is cross-linked within the coating.

25. The system of claim 1, wherein the window comprises a quartz window.

26. The system of claim 1, further comprising a first channel in proximity to the surface of the porous membrane, wherein the first channel is within the housing, and wherein the first channel is capable of exposing the fluid to the surface of the porous membrane.

27. The system of claim 26, further comprising a second channel, wherein the second channel is in proximity to a back surface of the porous membrane that is opposite the surf ace of the porous membrane, wherein the second channel is also within the housing, and wherein the second channel is capable of flowing a distillate from the porous membrane.

28. The system of claim 27, further comprising a third channel, wherein the third channel is in proximity to the second channel, and wherein the third channel is capable of flowing permeate fluid through the system of claim 1, wherein the permeate fluid is capable of propagating distilling by facilitating the condensation of the fluid to a distillate.

29. The system of claim 1, wherein the heat generated at the surface is capable of propagating distilling by creating a temperature gradient across the porous membrane.

* * * * *